(12) United States Patent
Barnes et al.

(10) Patent No.: US 8,639,081 B2
(45) Date of Patent: Jan. 28, 2014

(54) SLIDE ARRANGEMENT FOR CABLE DRAWER

(75) Inventors: Kathleen M. Barnes, Golden Valley, MN (US); Justin R. Horton, St. Louis Park, MN (US); Thomas C. Tinucci, Chaska, MN (US); Thomas L. Barnes, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/245,202

(22) Filed: Sep. 26, 2011

(65) Prior Publication Data

US 2012/0012713 A1    Jan. 19, 2012

Related U.S. Application Data

(60) Continuation of application No. 12/930,386, filed on Jan. 4, 2011, now Pat. No. 8,027,558, which is a division of application No. 12/380,592, filed on Feb. 27, 2009, now Pat. No. 7,869,683, which is a continuation of application No. 11/985,129, filed on Nov. 13, 2007, now Pat. No. 7,499,623, which is a continuation of application No. 11/635,946, filed on Dec. 8, 2006, now Pat. No. 7,308,184, which is a division of application No. 10/631,675, filed on Jul. 31, 2003, now Pat. No. 7,171,099.

(51) Int. Cl.
*G02B 6/00* (2006.01)
*A47B 88/00* (2006.01)

(52) U.S. Cl.
USPC ............. 385/135; 385/134; 385/137; 384/19; 312/330.1; 312/334.1; 312/334.8; 312/334.9; 312/334.12; 312/334.18

(58) Field of Classification Search
USPC ................ 385/135; 312/330.1, 334.1, 334.8, 312/334.9, 334.12, 334.18
See application file for complete search history.

(56) References Cited

U.S. PATENT DOCUMENTS

| | | | |
|---|---|---|---|
| 2,805,106 A | 9/1957 | Penkala | |
| 3,901,564 A | 8/1975 | Armstrong | |
| 4,070,076 A | * 1/1978 | Zwillinger | 312/350 |

(Continued)

FOREIGN PATENT DOCUMENTS

| | | |
|---|---|---|
| DE | 29 18 309 A1 | 11/1980 |
| DE | 38 36 273 A1 | 4/1990 |

(Continued)

OTHER PUBLICATIONS

European Search Report mailed Mar. 9, 2011.

*Primary Examiner* — Ryan Lepisto
(74) *Attorney, Agent, or Firm* — Merchant & Gould P.C.

(57) ABSTRACT

A drawer slide having first and second rails interconnected by a center rail. The center rail includes a spool configured to provide half-speed travel of the center rail relative to the travel of the first rail. The drawer slide is configured for use with a drawer assembly having a drawer and a chassis. The drawer assembly further includes a radius limiter secured to the center rail. The radius limiter travels at half-speed relative to the drawer. The radius limiter also automatically rotates relative to the travel of the drawer. The chassis includes sides including threaded backing plates, and mounting brackets. The mounting brackets include tri-lobed holes for receipt of a reciprocally shaped washer and a fastener for mounting the brackets to the chassis sides.

19 Claims, 20 Drawing Sheets

(56) References Cited

U.S. PATENT DOCUMENTS

| | | |
|---|---|---|
| 4,172,625 A | 10/1979 | Swain |
| 4,373,776 A | 2/1983 | Purdy |
| 4,737,039 A | 4/1988 | Sekerich |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,995,688 A | 2/1991 | Anton et al. |
| 5,066,149 A | 11/1991 | Wheeler et al. |
| 5,127,082 A | 6/1992 | Below et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,285,515 A | 2/1994 | Milanowski et al. |
| 5,323,480 A | 6/1994 | Mullaney et al. |
| 5,339,379 A | 8/1994 | Kutsch et al. |
| 5,497,444 A | 3/1996 | Wheeler |
| 5,511,144 A | 4/1996 | Hawkins et al. |
| 5,802,237 A | 9/1998 | Pulido |
| 5,811,055 A | 9/1998 | Geiger |
| 5,882,100 A | 3/1999 | Rock |
| 5,917,984 A | 6/1999 | Roseler et al. |
| 5,946,440 A | 8/1999 | Puetz |
| 5,966,492 A | 10/1999 | Bechamps et al. |
| 6,076,908 A | 6/2000 | Maffeo |
| 6,215,938 B1 | 4/2001 | Reitmeier et al. |
| 6,236,795 B1 | 5/2001 | Rodgers |
| 6,301,424 B1 | 10/2001 | Hwang |
| 6,438,310 B1 | 8/2002 | Lance et al. |
| 6,439,523 B1 | 8/2002 | Chandler et al. |
| 6,504,988 B1 | 1/2003 | Trebesch et al. |
| 6,677,520 B1 | 1/2004 | Kim et al. |
| 6,715,619 B2 | 4/2004 | Kim et al. |
| 6,748,155 B2 | 6/2004 | Kim et al. |
| 6,804,447 B2 | 10/2004 | Smith et al. |
| 6,865,331 B2 | 3/2005 | Mertesdorf |
| 6,945,620 B2 | 9/2005 | Lam et al. |
| 7,171,099 B2 | 1/2007 | Barnes et al. |
| 7,308,184 B2 | 12/2007 | Barnes et al. |
| 7,373,071 B2 | 5/2008 | Douglas et al. |
| 7,499,623 B2 | 3/2009 | Barnes et al. |
| 7,869,683 B2 | 1/2011 | Barnes et al. |
| 2003/0007767 A1 | 1/2003 | Douglas et al. |
| 2003/0165315 A1 | 9/2003 | Trebesch et al. |
| 2004/0011750 A1 | 1/2004 | Kim et al. |
| 2004/0013390 A1 | 1/2004 | Kim et al. |
| 2004/0136676 A1 | 7/2004 | Mertesdorf |
| 2004/0258384 A1 | 12/2004 | Trebesch et al. |

FOREIGN PATENT DOCUMENTS

| | | |
|---|---|---|
| DE | 44 13 136 C1 | 5/1995 |
| WO | WO 95/07480 | 3/1995 |
| WO | WO 96/10203 | 4/1996 |
| WO | WO 03/005095 A2 | 1/2003 |

* cited by examiner

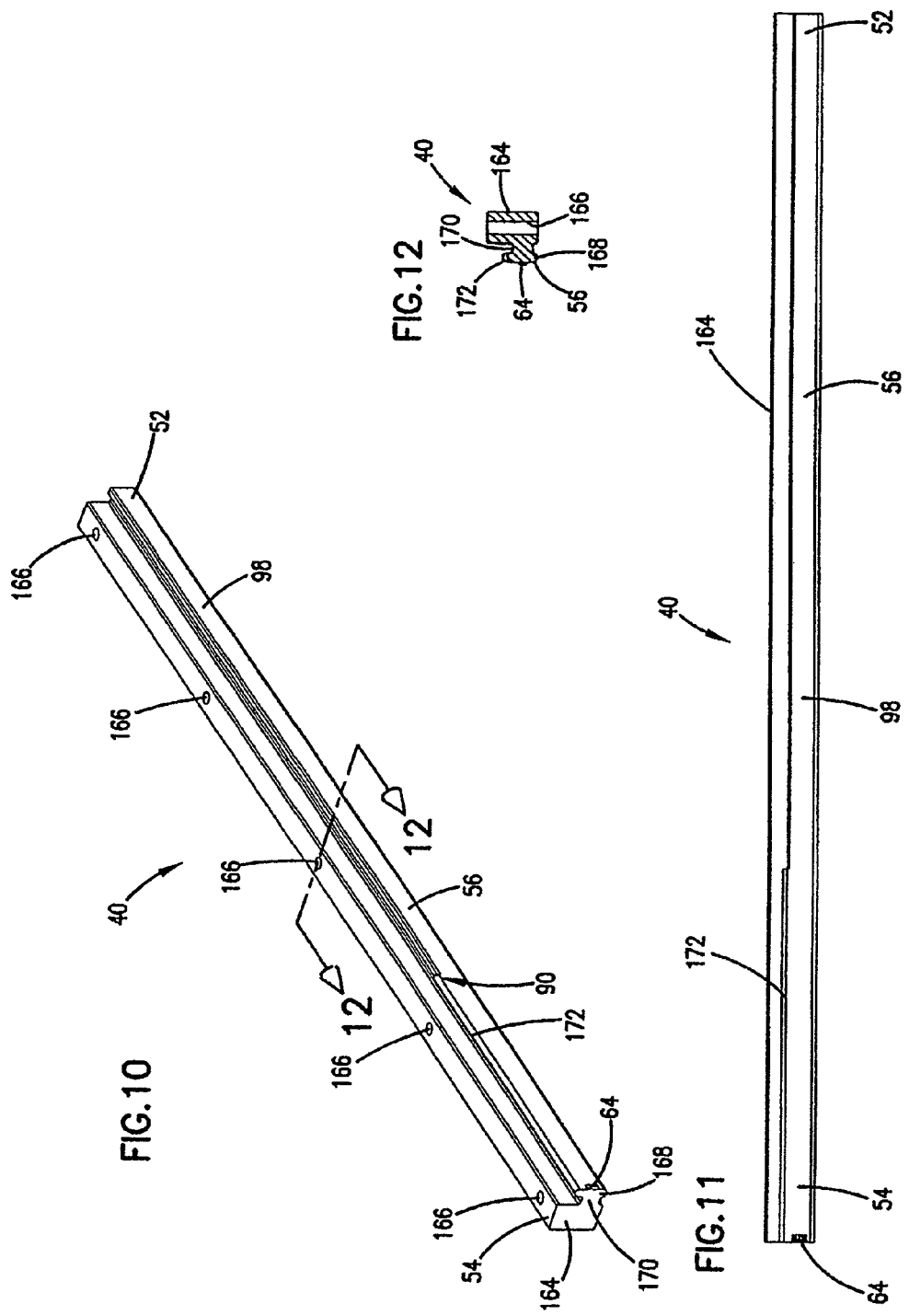

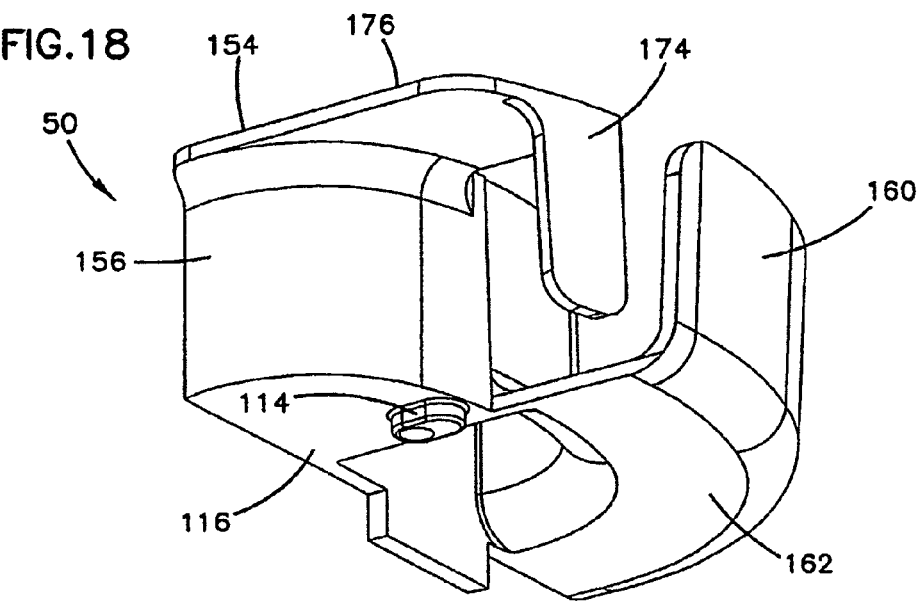
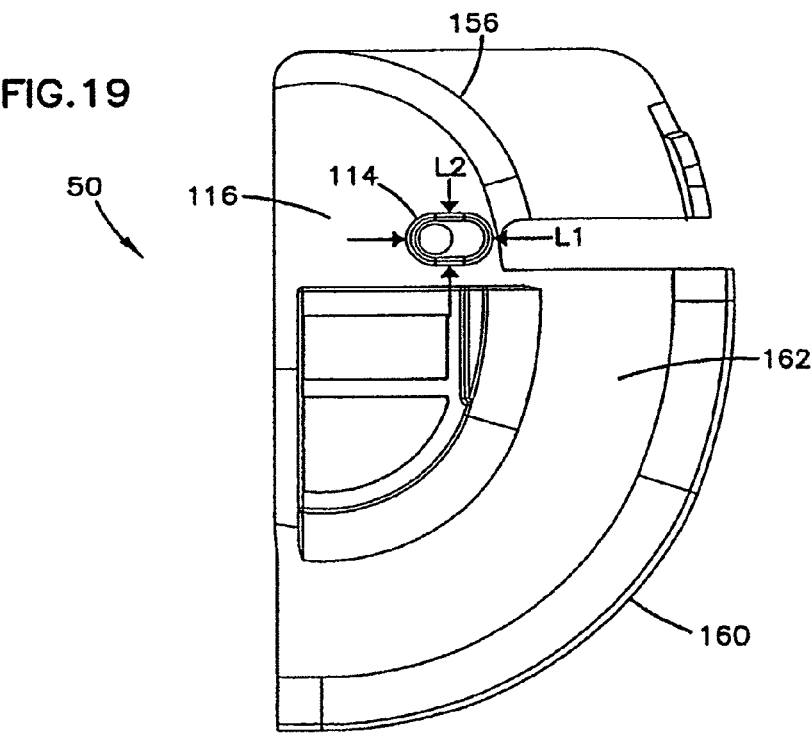

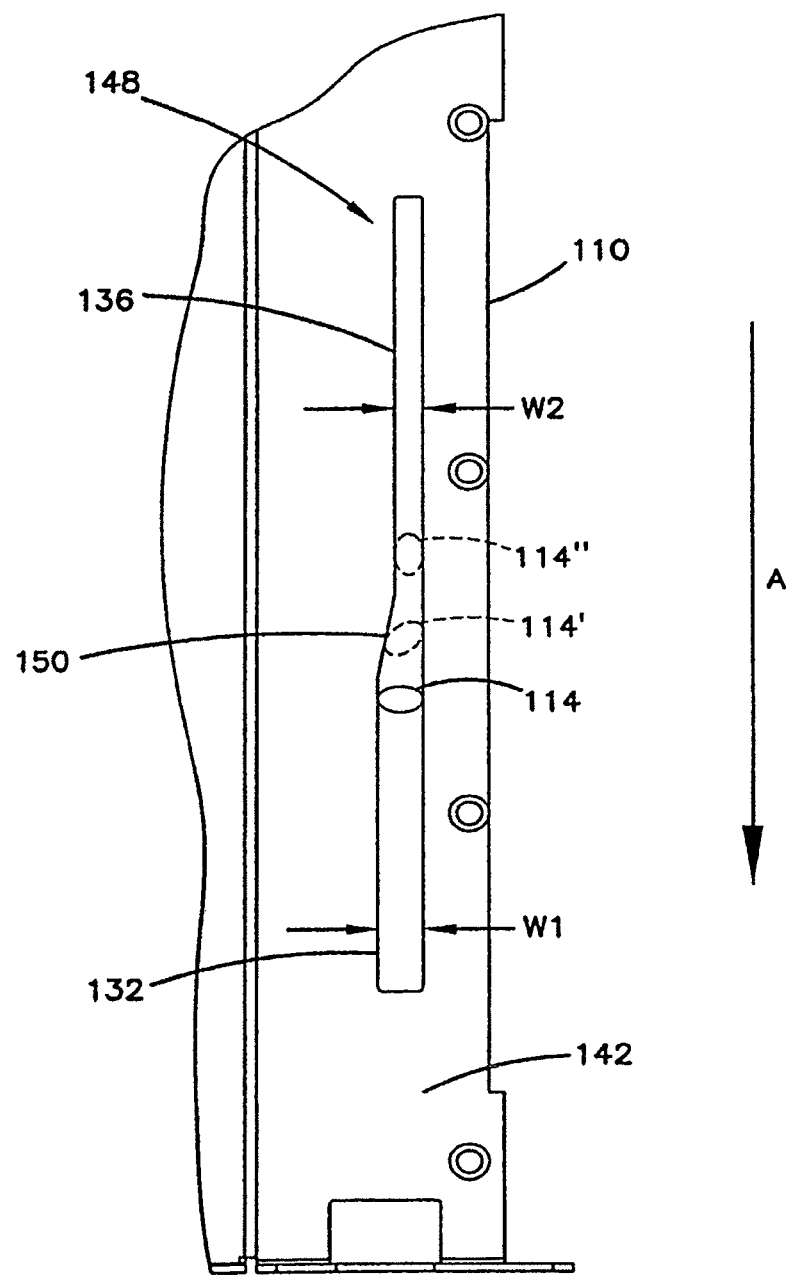

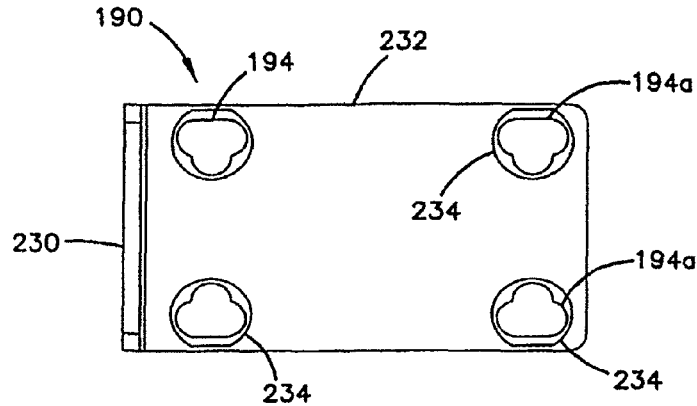
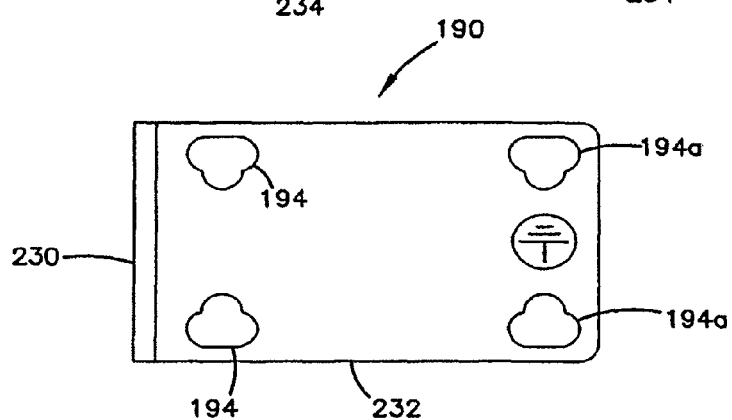
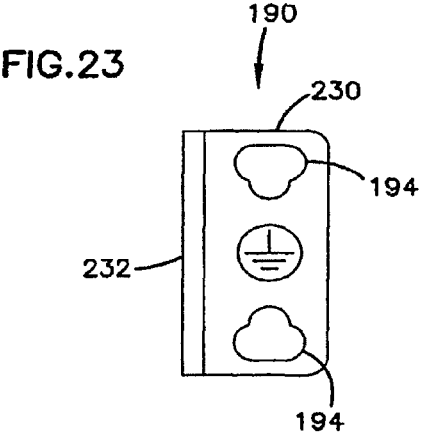
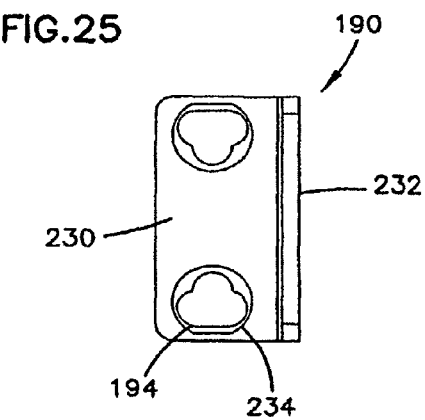

SLIDE ARRANGEMENT FOR CABLE DRAWER

CROSS-REFERENCE TO RELATED APPLICATIONS

This application is a continuation of application Ser. No. 12/930,386, filed Jan. 4, 2011, now U.S. Pat. No. 8,027,558, which is a divisional of application Ser. No. 12/380,592, filed Feb. 27, 2009, now U.S. Pat. No. 7,869,683, which is a continuation of application Ser. No. 11/985,129, filed Nov. 13, 2007, now U.S. Pat. No. 7,499,623, which is a continuation of application Ser. No. 11/635,946, filed Dec. 8, 2006, now U.S. Pat. No. 7,308,184, which is a divisional of application Ser. No. 10/631,675, filed Jul. 31, 2003, now U.S. Pat. No. 7,171,099, which applications are incorporated herein by reference in their entirety.

TECHNICAL FIELD

This disclosure concerns management of optical fiber cables. In particular, this disclosure relates to storage of optical fiber cables and devices in the telecommunications industry.

BACKGROUND

Cable storage devices and arrangements have been used to prevent unnecessary or excessive displacement of optical fibers. Some examples of known devices and arrangements are disclosed in U.S. Pat. Nos. 5,066,149 and 6,504,988, both assigned to ADC Telecommunications, Inc., and incorporated herein by reference. Other cable storage devices and arrangements are disclosed in U.S. application Ser. Nos. 09/900,465, filed Jul. 6, 2001, and 10/346,914, filed Jan. 15, 2003, both assigned to ADC Telecommunications, Inc., and incorporated herein by reference.

Generally, these devices and arrangement are provided so that when moving the trays or drawers, unnecessary or excessive displacement of the optical fiber cables is avoided. Excessive displacement can cause the optical fibers to bend resulting in attenuation and loss of signal strength. As the fiber bends, the fiber can also break, resulting in a loss of transmission through the fiber.

In general, improvement has been sought with respect to such devices and arrangements, generally to better accommodate: ease of use, manufacture, reliability, and cost of such devices.

SUMMARY

One aspect of the present disclosure relates to a slide arrangement including a center rail, a first rail, and a second rail. The first rail has a first structure configured to slidably engage a first construction of the center rail. The second rail has a second structure configured to slidably engage a second construction of the center rail. The slide arrangement also includes a spool configured to contact each of the first and second rails when the first rail slides relative to the second rail.

Another aspect of the present disclosure relates to a drawer arrangement including a drawer, a chassis, and a slide assembly. The slide assembly includes a first rail member secured to the drawer, a second rail member secured to the chassis, and a center rail member interconnecting the first and second rail members. The slide assembly also includes a spool configured to contact each of the first and second rails to permit full-speed travel of the first rail relative to the second rail, and half-speed travel of the center rail relative to the first rail.

Yet another aspect of the present disclosure relates to a drawer arrangement including a drawer, a chassis, a slide assembly, and a cable management device. The cable management device is secured to the slide assembly and is configured to linearly travel at half-speed relative to the drawer and automatically rotate in relation to the linear travel of the drawer.

A further aspect of the present disclosure relates to a slide arrangement including a center member, and first and second members slidably engaged with the center member so as to achieve relative sliding movement in a longitudinal direction. Preferably, the center member has an I-shaped cross-section including first and second longitudinal grooves. The first and second members each include a rail structure for slidable positioning within the first and second longitudinal grooves of the center rail.

Another aspect of the present disclosure relates to a mounting bracket for a drawer arrangement including a drawer, a chassis, and a slide assembly. The mounting brackets mount the chassis to a rack or other device. The chassis further includes a housing construction having a backing plate mounted to the chassis sidewalls and including threaded openings therethrough. Each of the mounting brackets includes first and second plate members disposed at 90° relative to one another wherein each of the first and second plate members includes at least two tri-lobed holes therethrough. A plurality of washers each having a reciprocally shaped bottom surface for mating with one of the tri-lobed holes are provided. Fasteners pass through each washer and through one of the tri-lobed holes of the mounting brackets to mount the brackets to the chassis.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 10 is a top perspective view of a rail of the drawer slide of FIG. 8;

FIG. 11 is a side elevational view of the rail of FIG. 10;

FIG. 12 is an enlarged cross-sectional view of the rail of FIG. 10, taken along line 12-12;

FIG. 18 is a bottom perspective view of the radius limiter of FIG. 17;

FIG. 19 is a bottom plan view of the radius limiter of FIG. 18;

FIG. 20 is a partial top plan view of a portion of the radius limiter of FIG. 19 engaged with the base construction of FIG. 6;

FIG. 23 is a front view of the mounting bracket of FIG. 22;

FIG. 24 is a first side view of the mounting bracket of FIG. 22;

FIG. 25 is a rear view of the mounting bracket of FIG. 22;

FIG. 26 is a second side view of the mounting bracket of FIG. 22;

DETAILED DESCRIPTION

Reference will now be made in detail to various features of the present disclosure that are illustrated in the accompanying drawings. Wherever possible, the same reference numbers will be used throughout the drawings to refer to the same or like parts.

I. Drawer Arrangement

Figure 1:
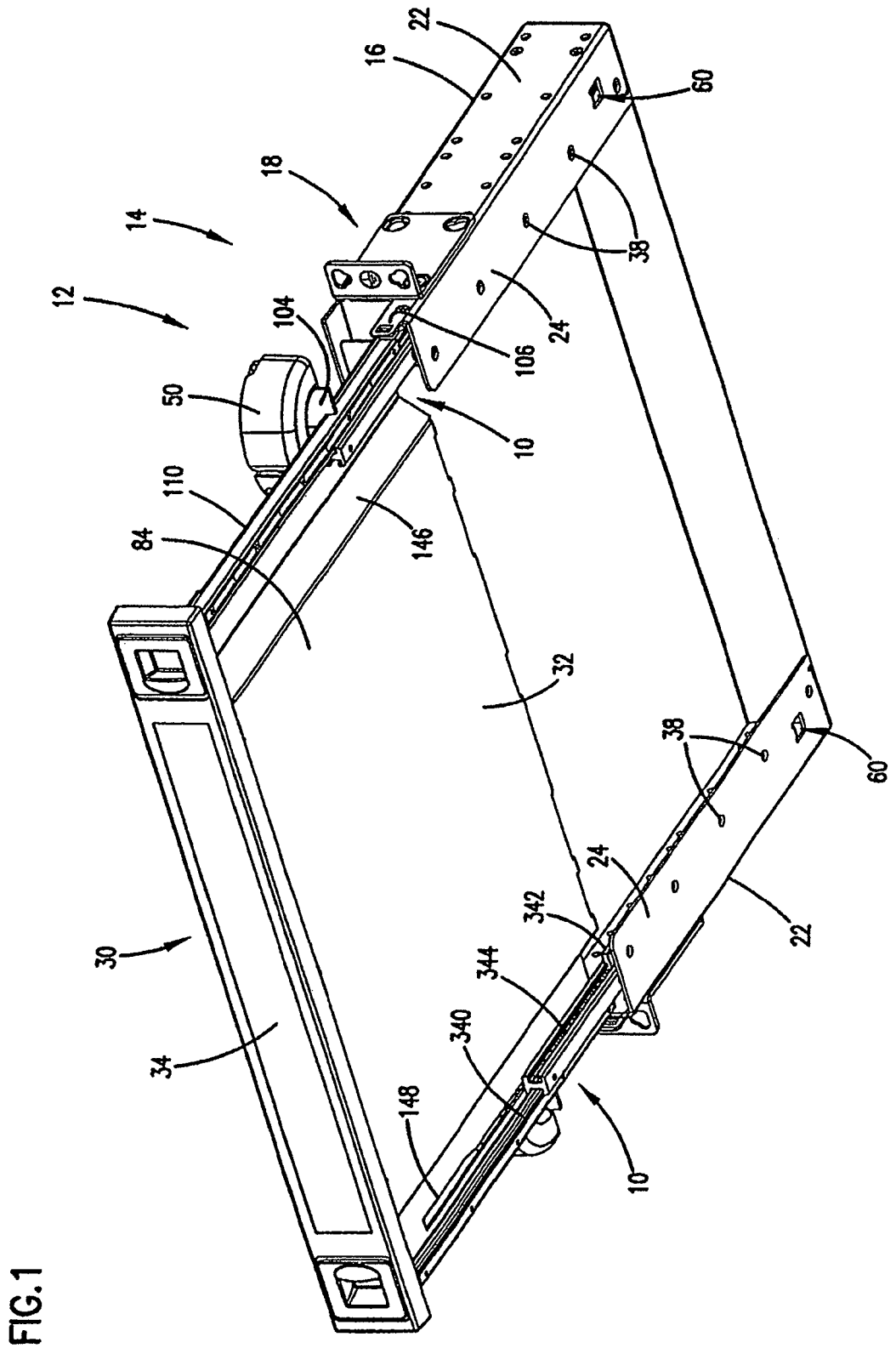
FIG. 1 is a bottom perspective view of one embodiment of a drawer arrangement shown in an open position and having a drawer slide according to the principles of the present disclosure.

Referring to FIG. 1, a drawer slide 10 for a cable management panel or module 12 according to the present invention is shown. The module 12 includes a drawer arrangement 14. The drawer arrangement 14 is typically constructed to mount to a rack, cabinet, enclosure, or other mounting fixture (not shown). In some applications, a number of drawer arrangements 14 incorporating the features of the present disclosure can be mounted to a rack or enclosure to provide a system of cable management modules 12.

As shown in FIG. 1-4, the drawer arrangement 14 includes a frame or chassis 16 and a drawer 30. The drawer slide 10 is operably interconnects the drawer 30 and the chassis 16; that is, the drawer 30 is configured to slide relative to the chassis 16 by operation of the drawer slide 10. In general, the drawer arrangement 14 is generally configured to slide outward from a closed position (FIG. 4) to an open position (FIG. 2) to access an interior 26 of the drawer 30. Typically, the drawer arrangement 14 is oriented and arranged such that the drawer 30 slides out horizontally (as represented by arrow A in FIG. 2) from the chassis 16.

Figure 2:
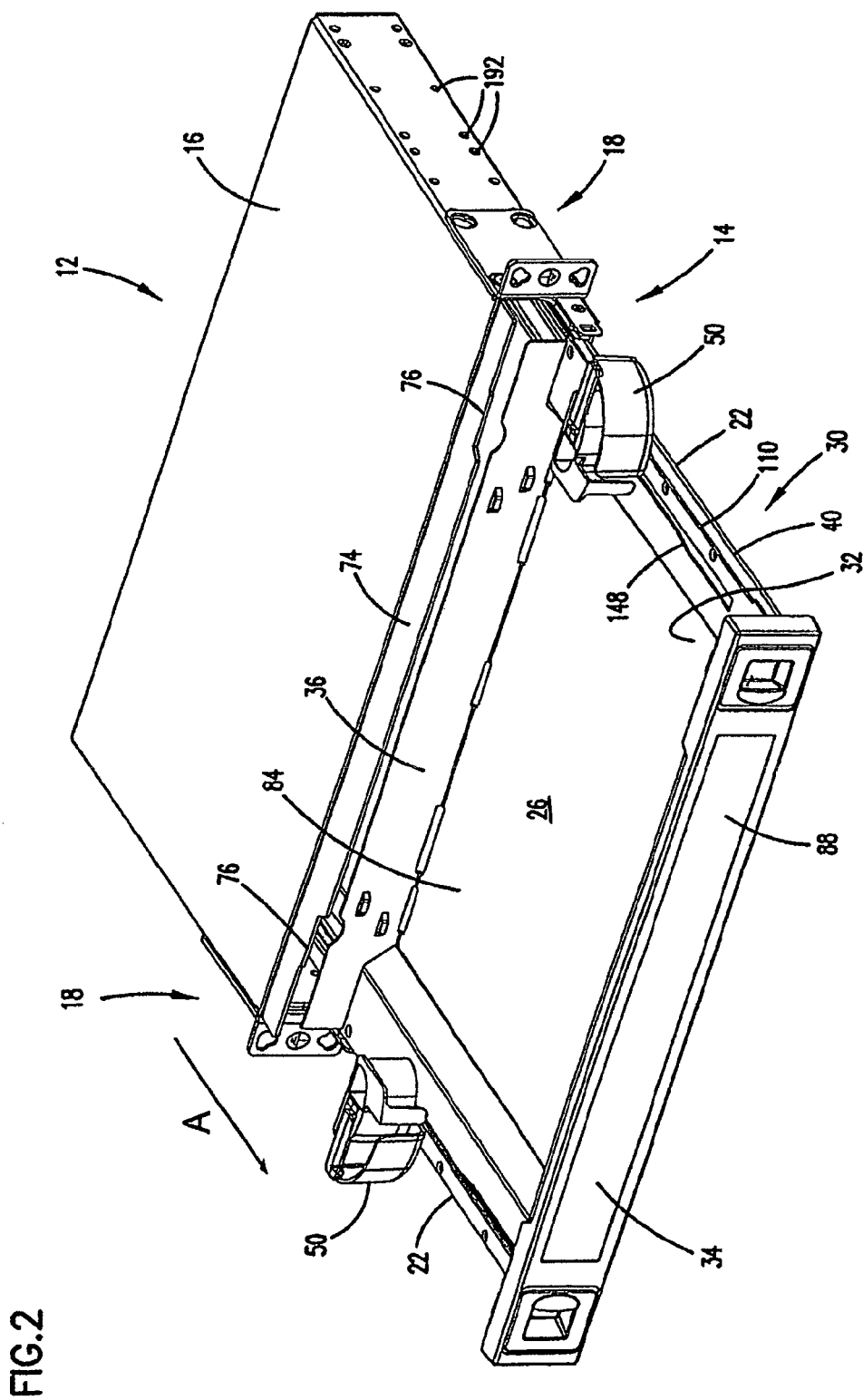
FIG. 2 is a top perspective view of the drawer arrangement of FIG. 1.
Figure 3:
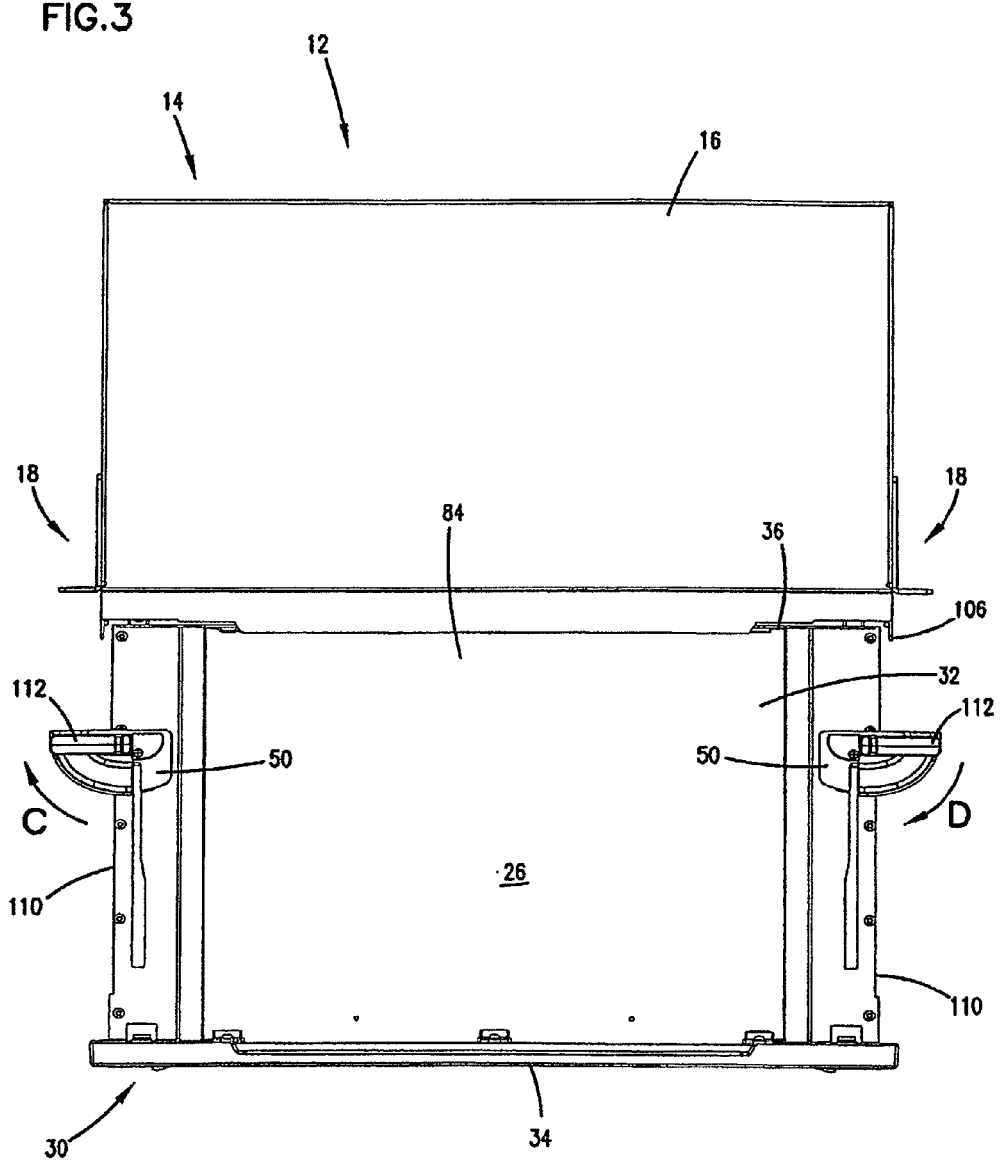
FIG. 3 is a top plan view of the drawer arrangement of FIG. 2.

As shown in FIGS. 1-3, the drawer 30 includes a base 32, a front wall 34 and a rear wall 36. Note that the drawer 30 is absent of side walls, or is "side wall-free." This design allows for cable entry and exit and prevents cable damage during sliding movement of the drawers 30 when accessing the cables and connectors or other devices in the drawer 30. The base 32, front wall 34 and rear wall 36 together define the storage interior 26 for holding and storing the cables.

The storage interior 26 of the drawer 30 is sized for receiving cable management or distribution structures. Examples of distribution structures include devices for storing the cables or connecting the cables to other cables and/or fiber optic devices, such as attenuators, couplers, switches, wave divisions multiplexers, splitters, combiners, or splices. In some embodiments, the distribution structures can be conveniently mounted on a tray insert (not shown) supported by a base construction 84 of the drawer 30. The tray insert can be customized as the particular needs vary and is convenient for structuring the drawer 30 to serve one or more desired functions in application with a drawer system. Examples of tray inserts are disclosed in U.S. Pat. No. 6,504,988, previously incorporated herein by reference. In the illustrated embodiment, the drawer arrangement 14 is constructed to be stackable and linkable to form a sub-cable management panel system. Such modularity also allows for ease of use for a variety of different needs of a cable management system.

In the embodiment of FIG. 1, the drawer arrangement 14 includes two opposingly positioned drawer slides 10 to provide sliding motion between the drawer 30 and the chassis 16. In addition, the drawer arrangement 14 includes a take-up mechanism or radius limiter 50, as described in greater detail below, for managing the cables during sliding movement of drawer 30. The take-up mechanism 50 protects the cables and prevents cable bending beyond a minimum bend radius when the drawer 30 slides open or closed.

Figure 5:
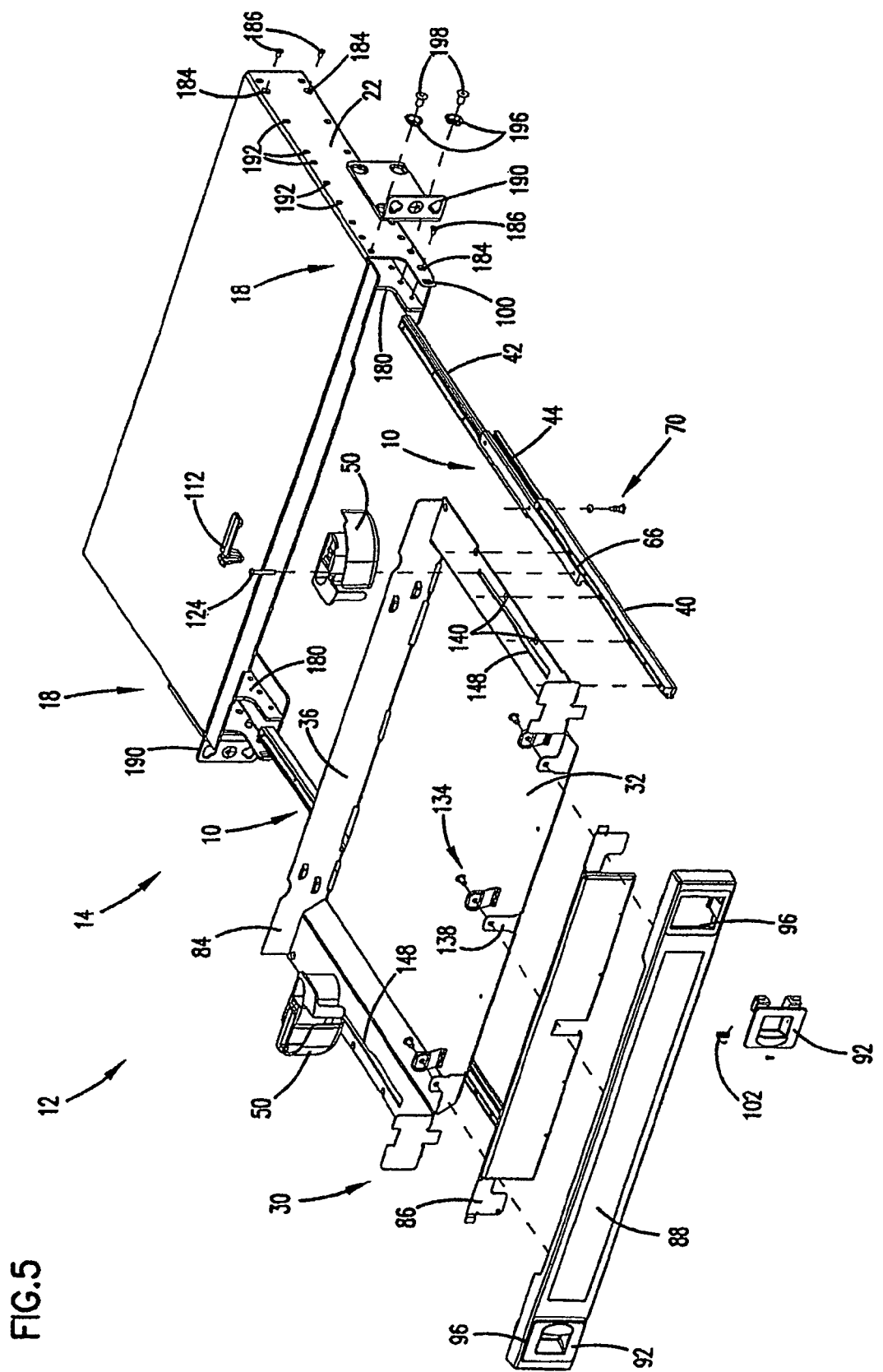
FIG. 5 is an exploded assembly view of the drawer arrangement of FIG. 2.
Figure 6:
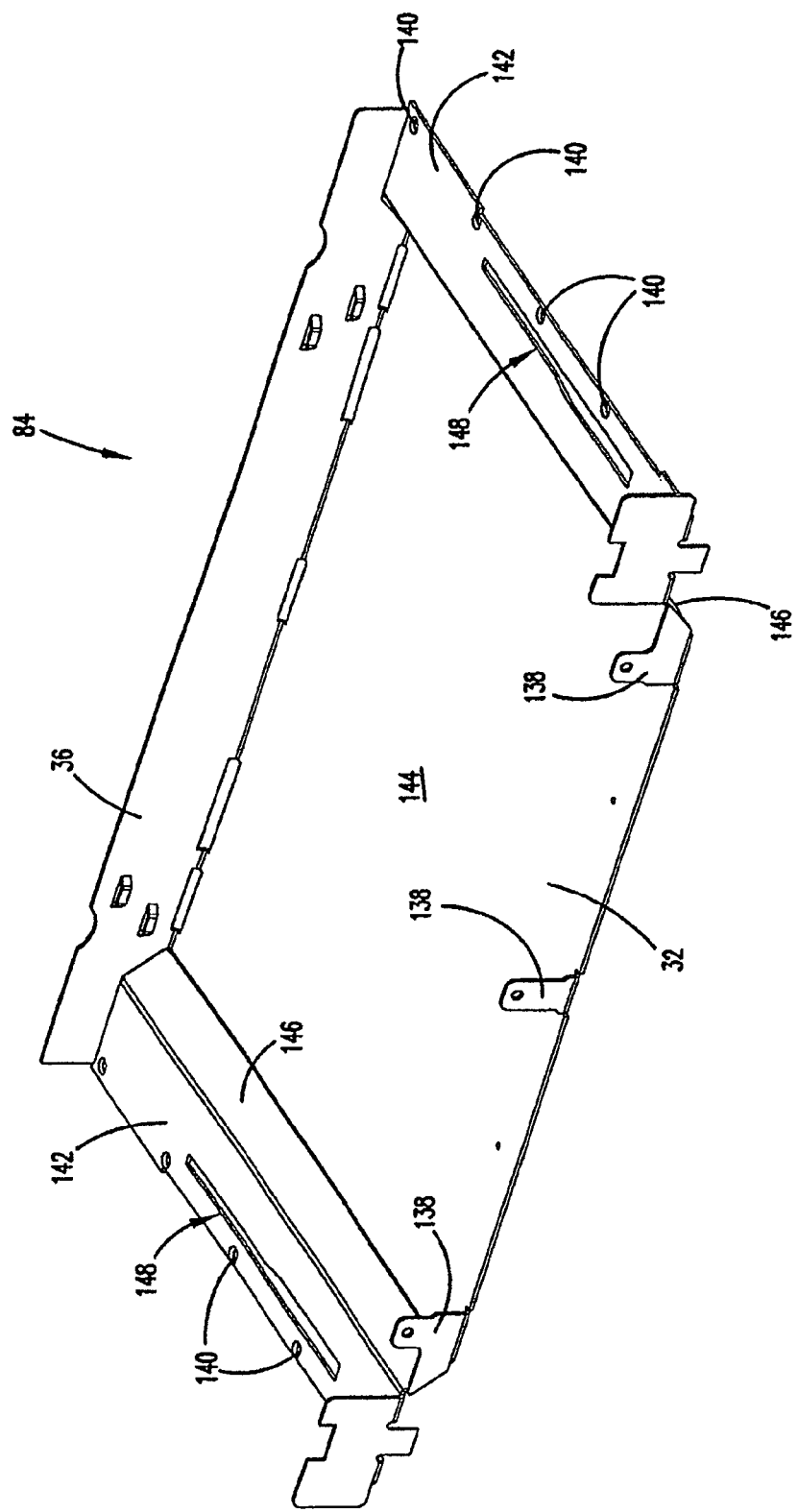
FIG. 6 is a top perspective view of a base construction of the drawer arrangement of FIG. 2.

Referring to FIG. 5, the base 32 and the rear wall 36 of the drawer 30 are generally defined by the base construction 84. As shown in FIG. 6, the base construction 84 further includes laterally extending side ledges 142 and angled transition sections 146 located between a central bottom 144 and each of the side ledges 142. A slot 148 is formed in each of the side ledges 142 of the base construction 84. The side ledges 142 also include holes 140 at which the drawer slide 10 is secured (FIG. 5). When assembled, the drawer slide 10 secures to the underside of the side ledge 142.

Referring to FIGS. 5 and 6, the illustrated base construction 84 includes mounting tabs 138 for use with mounting hardware 134 to secure the base construction 84 to a liner plate 86 and a front panel 88. The front panel 88 can be a separate component as shown, or can be an integral component of the base construction 84. In some arrangements, such as the one shown, the front panel 88 is made of plastic. In arrangements including a plastic front panel, the liner plate 86 is provided as safety precaution for containing any possible fires within the interior of the drawer. In general, the liner plate 86 and the front panel 88 of the illustrated embodiment define the front wall 34 of the drawer 30.

The illustrated front panel 88 includes openings 96 at opposite ends of the panel 88. A latch mechanism 92 is positioned in each of the openings 96 and is configured to selectively unlatch from engagement with a latch aperture 100 formed in the chassis 16. In general, the latch mechanism 92 locks or latches the drawer 30 in a secured closed position; and can be selectively unlocked or unlatched to permit the drawer 30 to slide open. In the illustrated embodiment, the latch mechanism 92 includes a spring 102 arranged to bias the latch mechanism 92 into engagement with the latch aperture 100 when the drawer 30 is in the closed position.

Figure 7:
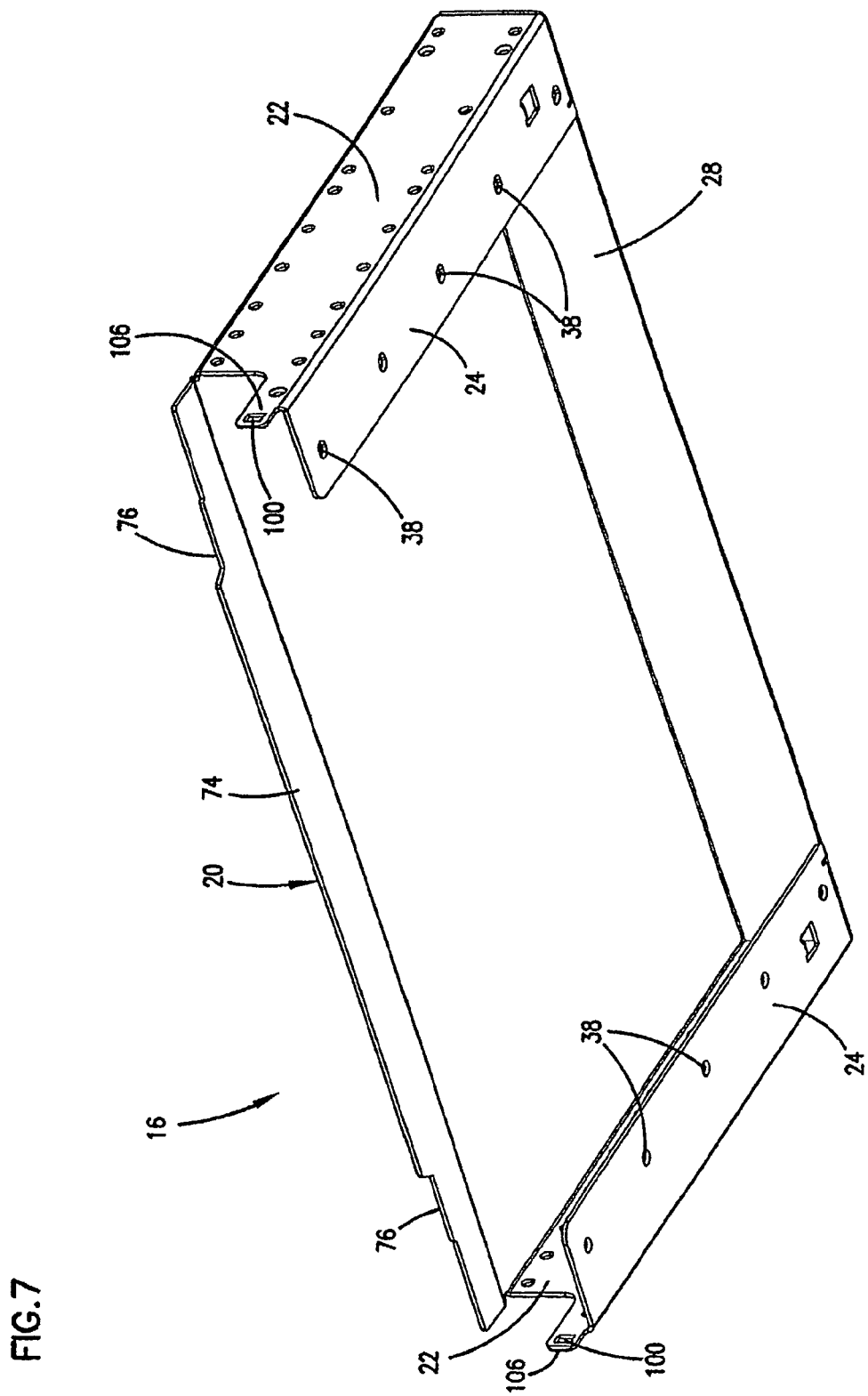
FIG. 7 is a bottom perspective view of a chassis of the drawer arrangement of FIG. 1.

Referring now to FIG. 7, the chassis 16 of the present drawer arrangement 14 includes a top cover 20, a back wall 28, sides 22, and inwardly projecting lower ledges 24. In the illustrated embodiment, each of the top cover 20, back wall 28, sides 22, and lower ledges 24 are an integral construction. That is, the chassis 16 can be formed of, for example, bent sheet metal; although it is contemplated that each component of the chassis 16 can also be constructed individually and fastened together.

Figure 4:
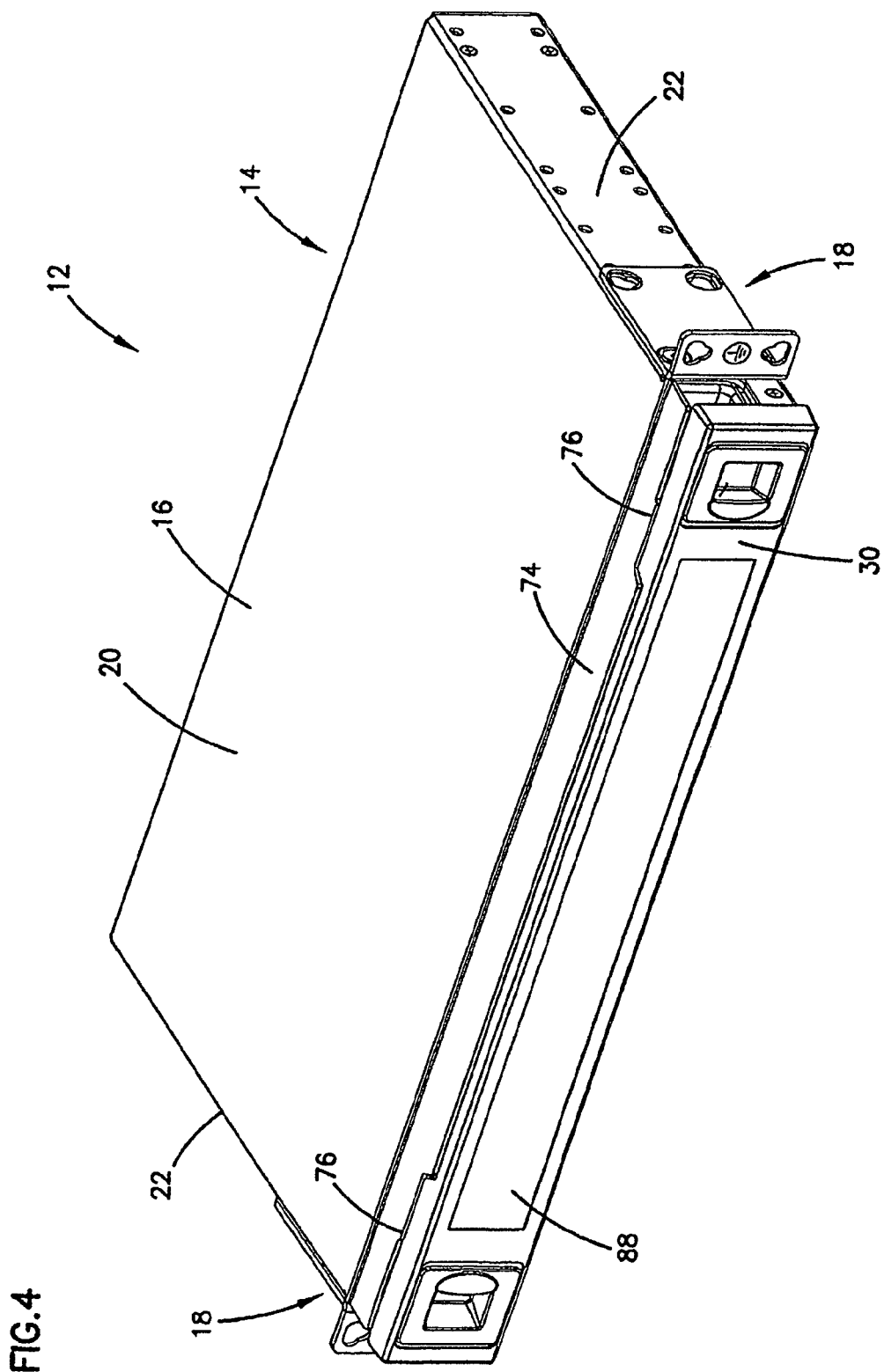
FIG. 4 is a top perspective view of the drawer arrangement of FIG. 3, shown in a closed position.

The top cover 20 includes an extending lip 74 the functions as a labyrinth seal to reduce dust and particulate from entering the drawer interior 26 when the drawer 30 is in the closed position (FIG. 4). The lip 74 has cut-out regions 76 so that a user can easily grasp the front panel 88 of the drawer 30 to slide the drawer open (FIG. 2). In the illustrated embodiment, the cut-out regions 76 of the extending lip 74 are located adjacent to the sides 22 of the chassis 16.

The sides 22 include an extension piece 106 that projects forward from the side 22. The latch aperture 100 is formed in the extension piece 106 and is positioned to operate with the latch mechanism 92 as previously described. The extension piece also operates in conjunction with the radius limiter 50, which operation is described in greater detail hereinafter.

The lower ledges 24 of the chassis 16 include holes 38 at which the drawer slide 10 is secured to the chassis 16. As shown in FIG. 1, the drawer slide 10 is positioned on top of the lower ledge 24 of the chassis 16. The location of the drawer slide 10 (i.e. on top of the lower ledge 24) is accommodated by the angled transition section 146 of the base construction 84.

II. Drawer Slide

Referring again to FIG. 5, the drawer slide 10 includes three slide members: a first rail 40, a second rail 42, and a center rail 44. In the illustrated embodiment, the first rail 40 is secured to the base 32 of the drawer 30 (i.e. the side ledges 142 of the base construction 84), and the second rail 42 is secure to the lower ledges 24 of the chassis 16. The center rail 44 interconnects the first rail 40 and the second rail 42. In operation, when the drawer 30 is moved relative to the chassis 16, the first rail 40 and the center rail 44 slide relative to the second rail 42.

Figure 8:
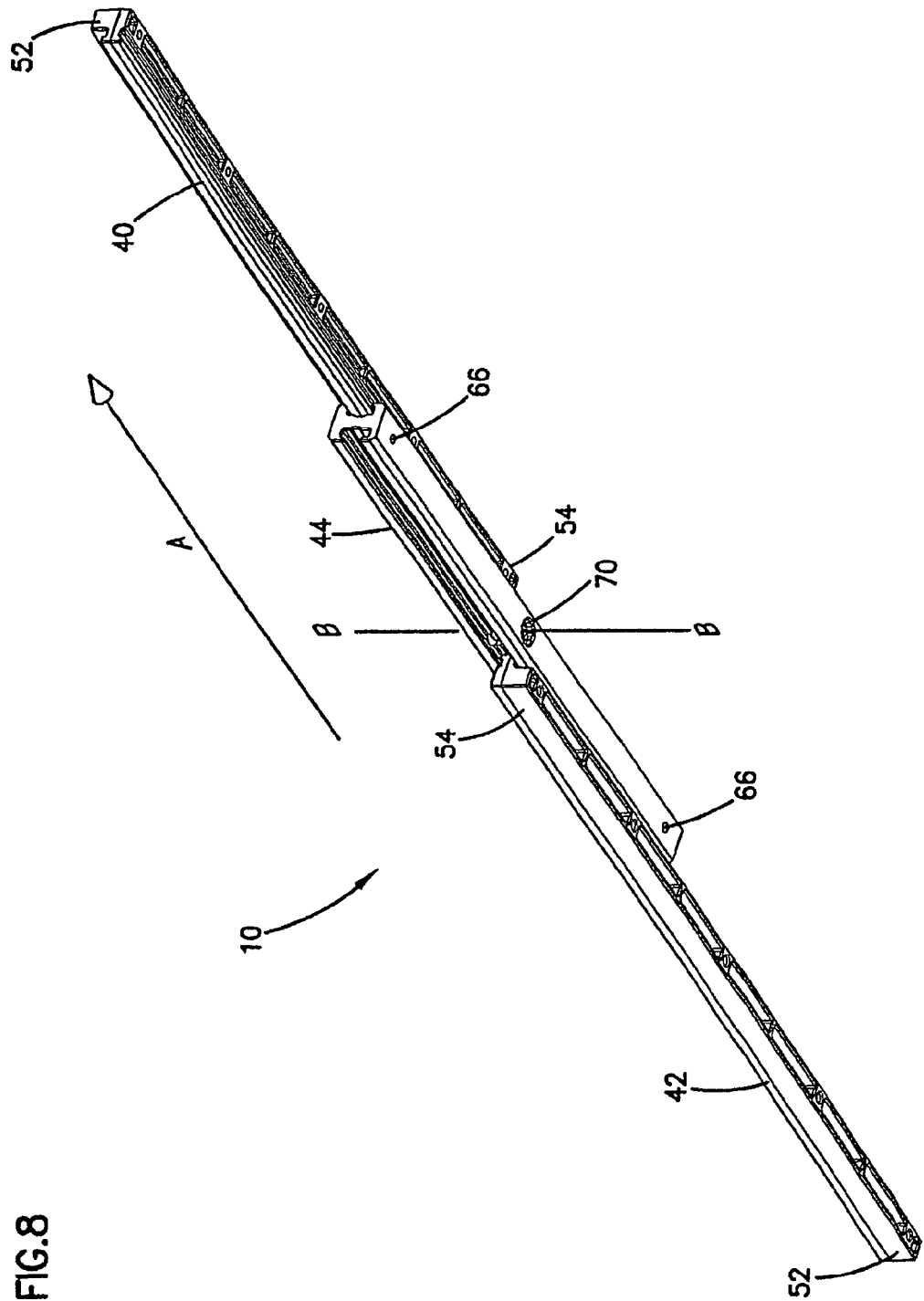
FIG. 8 is bottom perspective view of the drawer slide shown in FIG. 1.

Referring now to FIG. 8, the drawer slide 10 is shown with each of the rails 40, 42, and 44 assembled in relation to one another. Each of the first and second rails 40, 42 includes a first end 52 and a second end 54. The first end 52 of each rail is generally the end that is furthest from the center rail 44 when the drawer slide 10 is in an expanded or opened orientation. The direction of sliding movement is represented by arrow A.

Figure 9:
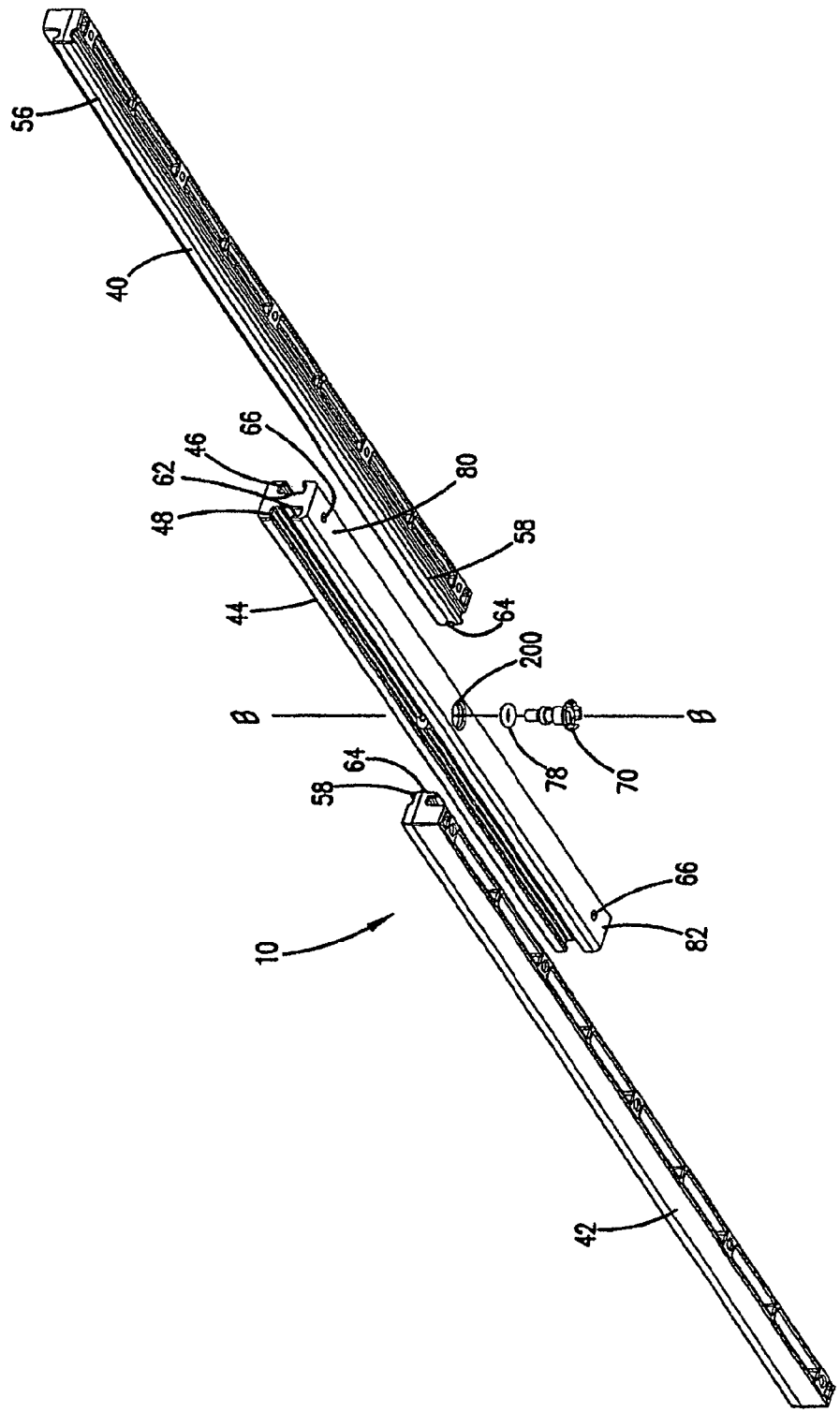
FIG. 9 is an explosed assembly view of the drawer slide of FIG. 8.

FIG. 9 is an exploded assembly view illustrates the drawer slide 10. As shown, the center rail 44 has grooves, including a first groove 46 and a second groove 48 extending from a first end 80 to a second end 82 of the center rail 44. The grooves 46, 48 are located on opposite sides of the center rail 44 and generally define an I-shaped cross-section of the center rail. The first and second grooves 46, 48 are configured for interlocking connection with the first and second rails 40, 42. In particular, the grooves are configured for corresponding receipt of interlocking structure or protrusions 56, 58 that extend along the first and second rails 40, 42, respectively. The center rail may include a upper and lower edges or lips 68 that partially define the grooves 46, 48. The lips 68 interlock with the first and second rails 44 so that the rails 40, 42 cannot laterally move relative to the center rail 44.

Referring now to FIGS. 10-12, one embodiment of a rail is shown. Each of the first and second rails 40, 42 are mirror images of the other, thus only one of the rails, the first rail 40, is illustrated. The following description and illustrations of the first rail 40 apply to the second rail 42, as the second rail is an identical mirrored construction of the first rail 40.

As shown in FIG. 10, the first rail 40 includes a primary rail portion 164. The primary rail portion 164 defines mounting structures 166 for fastening or securing the first rail 40 to the drawer 30. The mounting structures 166 can include through holes, threaded holes, or any other type of structure for securing the rail to the drawer 30. As shown in FIGS. 1 and 2, each of the first rails 40 is secured between outer edges 110 of the drawer 30 and the slots 148 of the drawer. The compact size of the drawer slide 10 facilitates this location of the first rail 40, which is advantageous in further structurally supporting the slot 148 configuration formed in the drawer. As can be understood, the second rail 42 accordingly includes mounting structures for securing the second rail to the chassis 16.

The protrusion 56 of the first rail 40 extends outward from the primary rail portion 164. As shown in FIG. 12, the cross-sectional configuration of the protrusion 56 includes an elongated portion 168 attached to the primary rail portion 164 by a neck 170. The elongated portion of the protrusion 56 is configured to interlock with the groove 46 of the center rail 44 so that the first and center rails 40, 44 cannot laterally move relative to one another.

The elongated portion 168 of the protrusion 56 extends from the first end 52 of the rail 40 to the second end 42. A shoulder or stop structure 172 is located along a section of the elongated portion 168. In the illustrated embodiment, the stop structure 172 is extends along an upper region of the elongated portion 168 adjacent to the second end 54 of the rail 40. As will be described in greater detail hereinafter, the stop structure 172 interacts with the center rail to provide a positive stop of relative movement between the first rail 40 and the center rail 44.

In use, the preferred drawer slide 10 provides synchronized slidable movement of the center rail 44 and first rail 40 when the second rail 42 is held stationary or is affixed to the chassis 16. In particular, the drawer slide 10 provides synchronized slidable movement of the radius limiter 50 relative to slidable movement of the drawer 30. The synchronized movement of the radius limiter 50 and the drawer 30 ensures that cables stored within the interior 26 of the drawer 30 do not bend too sharply when the drawer 30 is being opened or closed. If the cables were to bend too sharply, loss of signal strength or loss of transmission may occur.

As shown in FIG. 5, the radius limiter 50 secures to the center rail 44. The center rail 44 includes a wheel or spool 70 configured to provide half speed linear movement by rotational contact with both the first and second rails 40, 42. That is, when the drawer 30 is slid relative to the chassis 16, the spool 70 rotates between the first and second rails 40, 42 to permit the first rail 40 to travel at full speed and causes the center rail 44 to travel at half speed. In the illustrated embodiment, the spool 70 is self-contained within the drawer slide 10; thereby placement of the drawer slide 10 relative to the drawer 30 and chassis 16 is not limited by, for example, a contact requirement between the spool and the chassis or spool diameter. In addition, the drawer slide 10 is not limited to a particular drawer length. The self-contained feature adapts well to drawer arrangements having different drawer depths.

Referring to FIG. 8, the spool 70 is configured to rotate about the axis of rotation B that is perpendicular to the direction A of slidable movement of the drawer slide 10. More specifically, the axis of rotation B is generally perpendicular, in a vertical direction, relative to the direction A of slidable horizontal movement of the drawer 30. By having the spool 70 rotate about axis B in a vertical direction relative to the horizontal movement of the drawer 30, there is a reduction in problems associated with manufacturing and assembly of the drawer arrangement 14.

For example, in prior arrangements, a wheel was oriented to have a horizontal axis of rotation. In these prior arrangements, the wheel rode on or was in direct contact with the drawer or chassis. Accordingly, sheet metal flatness, parallelism, and tolerance stack ups had to be carefully controlled because it was critical to wheel engagement. In addition, the wheel would push the drawer and its components, for example, upwards towards the drawer cover due to the orientation of the wheel, which sometimes caused interference problems. By orienting the spool 70 with the axis of rotation B in a vertical direction, many of these problems are minimized or eliminated all together.

Figure 13:
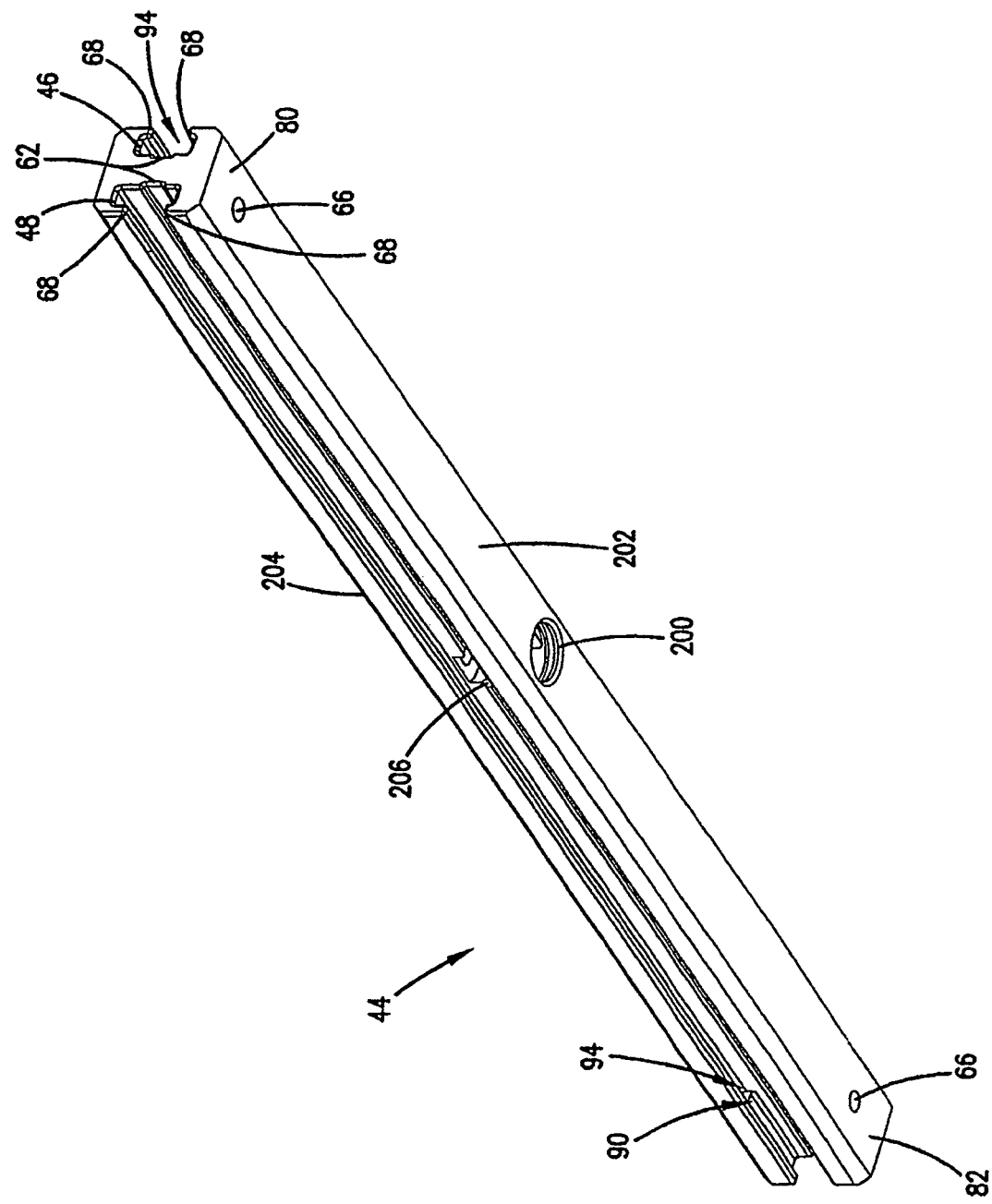
FIG. 13 is a bottom perspective view of a center component of the drawer slide of FIG. 8.
Figure 14:
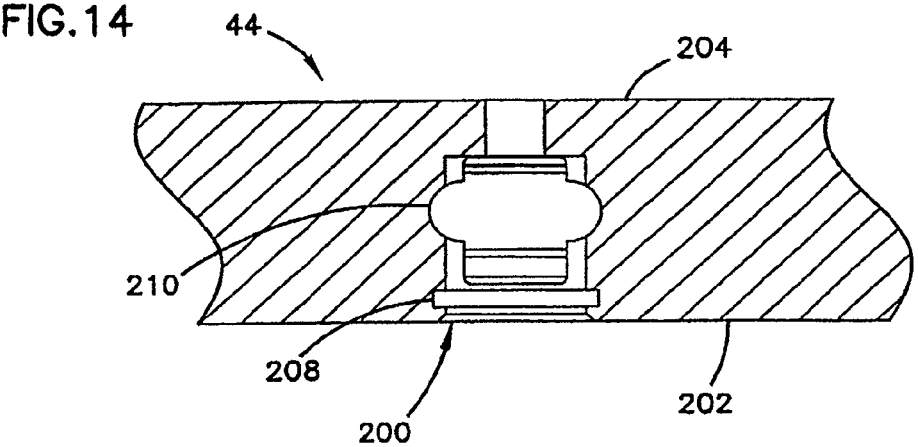
FIG. 14 is a partial cross-sectional view of the center component of FIG. 13.
Figure 15:
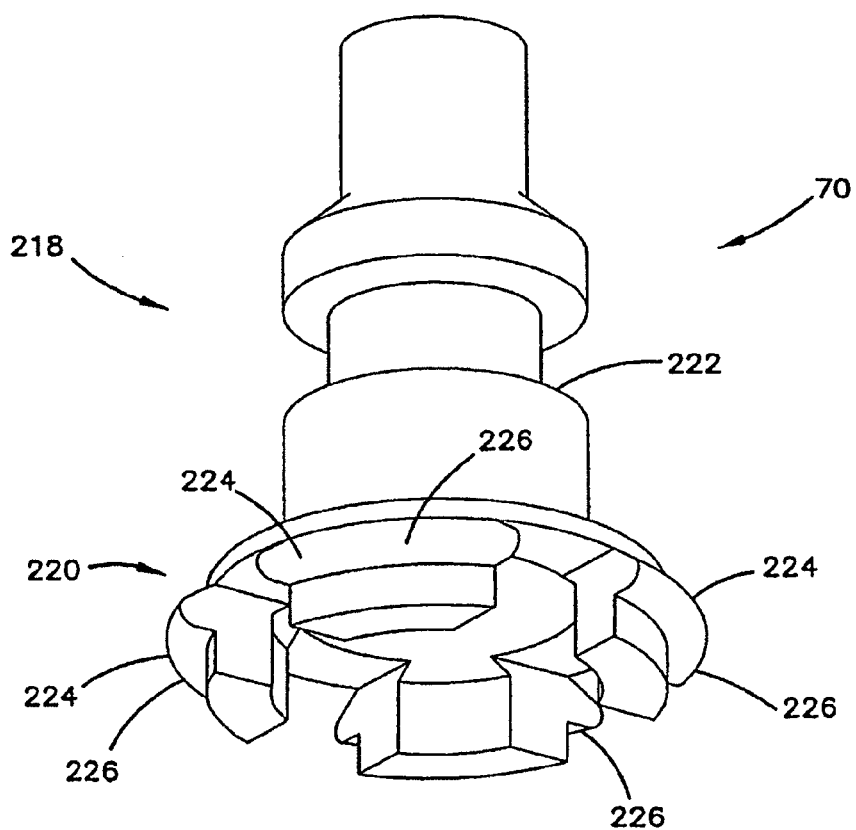
FIG. 15 is a perspective view of a spool of the drawer slide of FIG. 9.

Referring now to FIGS. 13-15, the center rail 44 includes receiving structure 200 within which the spool 70 is located. In the illustrated embodiment, the receiving structure 200 extends through the center rail 44 from a bottom surface 202 to a top surface 204. As shown in FIG. 13, the receiving structure 200 defines first and second apertures 206 (only one shown in side view of FIG. 13) that extend into the corresponding first and second grooves 46 and 48.

As shown in FIG. 15, the spool 70 generally includes an axle 218 and a retaining cap 220. The retaining cap 220 has an outer ring 224. The outer ring 224 is sized to fit within a first annular section 208 of the center rail 44 (FIG. 14). The outer ring 224 preferably includes circumferentially spaced-apart sections 226. In the illustrated embodiment, the outer ring 224 includes four sections 226 spaced at approximately 90° intervals. The spaced-apart sections 226 are configured for flexure so that the sections 226 flex and snap-fit the outer ring 224 into the first annular section 208. Providing a snap-fit connection reduces costs associated with assembly of the drawer arrangement 14. Other outer ring configurations that provide the convenient snap-fit feature can be used, including outer rings having more or less than four flexible section 226, for example.

In the preferred embodiment, the spool 70 includes an o-ring or compressible ring 78 (FIG. 9) that circumscribes the spool 70 to provide a gripping interface during operation. The axle 218 of the spool 70 includes a retaining groove 222. The retaining groove 222 is configured to maintain placement of the o-ring 78 in the groove 222 about the axle 218. When the spool 70 is placed within the receiving structure 200 of the center rail 44, the o-ring 78 is located within a second annular section 210 (FIG. 14). The second annular section 210 defines the apertures 206 (FIG. 13) that extend into the grooves 46, 48 of the center rail. That is, the second annular section 210 is configured to extend into the groove 46, 48 to define the apertures 206 through which the o-ring extends to contact the first and second rails 40, 42 during operation.

In operation, each of the first, second and center rails 40, 42, 44 slidably moves relative to the other rails. As the rails linearly travel relative to one another, the o-ring 78 and spool 70 rotate by contact of the o-ring 78 with an engagement surface 98 (FIG. 11) of the protrusions 56, 58. In some embodiments, the engagement surface 98 may have a particular surface finish to enhance engagement between the o-ring 78 and the surface 98 of each of the first and second rails 40, 42. Preferably, the o-ring 78 is under some compression sufficient enough to maintain the drawer 30 in a fixed position when a user has released the drawer 30 in a partially-opened or partially-closed position. This addresses problems found in prior drawer slides having a ball-bearing arrangement where a drawer may unintentionally continue to roll open or closed due to the weight of the drawer.

Referring back to FIG. 13, each of the grooves 46, 48 of the center rail 44 includes has a longitudinal recess 62. The longitudinal recess 62 is positioned generally toward the center of the center rail 44 and is configured to accommodate a projection or catch 64 located at the second end 58 (FIG. 10) of each of the first and second rails 40, 42. The catch 64 of each of the first and second rails 40, 42 slides within the longitudinal recess 62 of the center rail 44. The catch 64 is sized and configured such that that catch will slidably move along within the longitudinal recess without interference, until the catch 64 contacts the ring 80 of the spool 70. Preferably, the catch 64 is positioned and sized to provide sufficient interference with the ring 80 to cause a cease or pause in sliding movement of the drawer. The pause in movement, caused by the interference, indicates to a user that the drawer 30 has reached its fully-open position.

Because of the compliance of the ring 80, the drawer 30 can be pulled out farther from the fully-open position. As shown in FIGS. 10 and 13, the drawer slide also includes a positive stop arrangement 90 that prevents the drawer 30 from being total separated from the chassis 16 when sliding the drawer 30 open.

The positive stop arrangement 90 is provided by engagement of the stop structures 172 (FIG. 10) located on each of the first and second rails 40, 42, and stop ledges or stops 94 (FIG. 13) located on the center rail 44. In the illustrated embodiment, the stop structures 172 extend a distance from the second ends 54 of the first and second rails 40, 42. The corresponding stops 94 extend a distance from each of the ends 80, 82 of the center rail 44. The stop structures 172 of each rail 40, 42 engage the stops 94 on the center rail 44 when the drawer 30 is pulled out beyond the fully-open position. This engagement positively stops further movement of the drawer 30 and prevents the drawer 30 from being totally separated from the chassis 16.

The drawer arrangement 14 has been designed to account for rough handling or excessive loading that may cause the rails 40, 42, 44 of the drawer slide 10 to become mismatched or longitudinally mis-located in relation to one another. In the event of longitudinally mis-location, the rails 40, 42, 44 of the drawer slide 10 can be re-located into proper relative orientation by fully extending the drawer 30 or fully closing the drawer. In particular, when the drawer 30 is in the fully closed position, the center rail 44 contacts a tab 60 (FIG. 1) projecting upward from the lower ledge 24 of the chassis 16. This contact holds the center rail 44 in a stationary position, and as a user continues to push the drawer 30 closed, any mismatch is corrected as the first and second rail 40, 42 skid or skip across the o-ring 78 of the spool 70 to the fully-closed position. Likewise, when the drawer 30 is extended beyond the fully-open position, to the point where the positive stop arrangement 90 is engaged, the rails 40, 42, 44 also may skid or skip across the o-ring 78 of the spool 70 to correct any mismatch.

III. Radius Limiter/Take-Up Mechanism

Referring to FIGS. 2 and 3, the radius limiter 50 is arranged relative to the drawer 30 to permit movement of cable through a wide range of angles. In particular, the radius limiter 50 is configured to rotate or pivot relative to the drawer 30 to prevent cables from bending beyond a minimum bend radius when the drawer slides open or closed.

Figure 16:
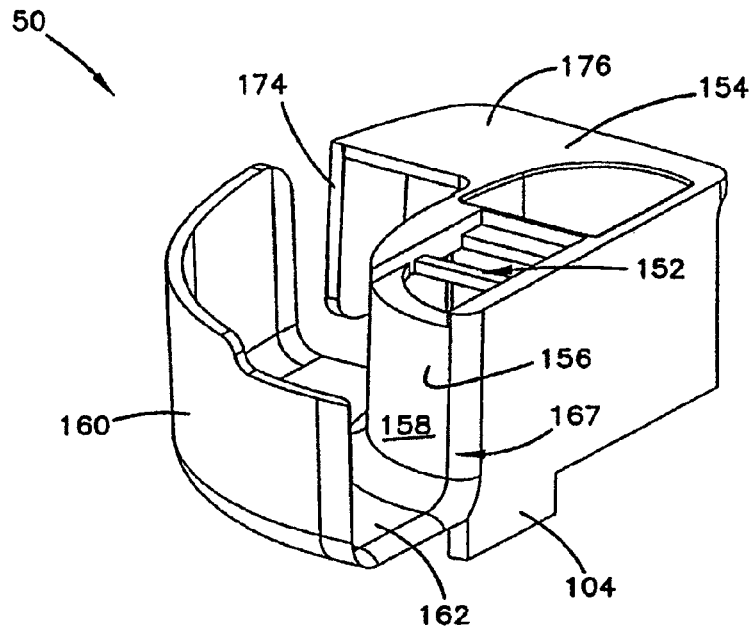
FIG. 16 is a rear perspective view of one embodiment of a radius limiter according to the principles discloses, and shown in FIG. 2.
Figure 17:
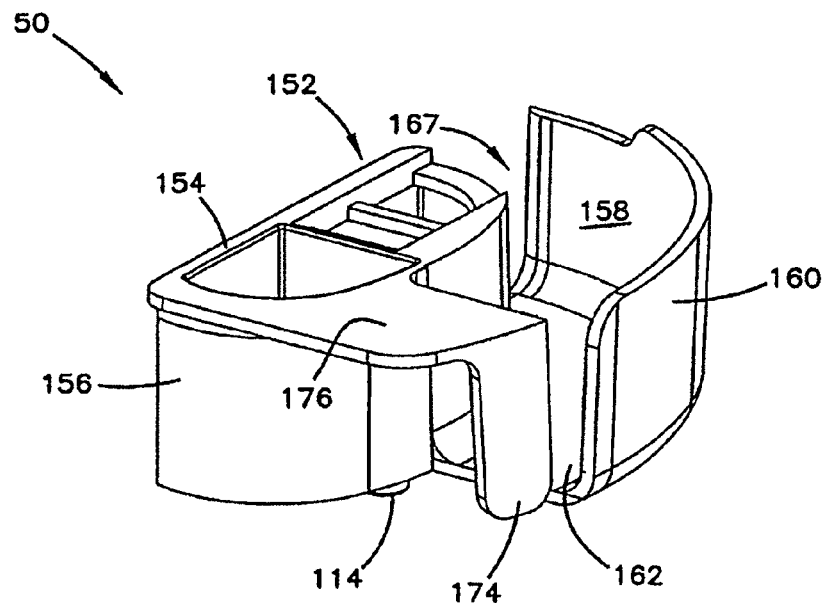
FIG. 17 is a front perspective view of the radius limiter of FIG. 16.

Referring now to FIGS. 16 and 17, the illustrated embodiment of the radius limiter 50 includes a frame piece 154 having a first vertically oriented curved wall 156. A trough section 158 is located adjacent to the vertically curved wall 156. The trough section 158 is defined by the first curved wall 156, a second vertically oriented curved wall 160, and a base 162 that bridges or joins the walls 156, 160. In general, the trough section 158 is generally arcuate, that is the trough section 158 has a semi-circle or half-moon shape.

As illustrated, the illustrated radius limiter 50 also includes an extension portion 174 depending from the frame piece 154. The extension portion 174 depends downwardly from a top portion 176 of the frame piece 154. The top portion 176 and the extension portion 174 partially define a region of the trough section 158. The extension portion 174 assists in guiding and retaining the cables within the trough section 158 so that the cables are not pinched between the radius limiter 50 and the chassis 16 when the drawer 30 slides open and closed.

Still referring to FIGS. 16 and 17, the frame piece 154 defines a cable entry opening 167 adjacent the curved wall 156 of the frame piece 154. The cable entry opening 167 is in communication with the trough section 158. The opening 167 permits cables to enter through the opening 167 and rest within the trough section 158.

As shown in FIGS. 3 and 5, the illustrated radius limiter 50 includes a finger 112. The finger 112 connects to the frame 154 and covers a portion of the trough section 158. In preferred embodiments, the finger 112 is selectively pivotable relative to the frame 154 via a latching configuration 152 (FIG. 16). The finger 112 pivots away from remaining portions of the radius limiter 50 to provide a gap or space between the finger 112 and the radius limiter 50. This gap or space facilitates loading of cable into the trough 158 and the storage interior 26 of the drawer arrangement 14. The finger 112 also helps to hold the cables in place within the radius limiter 50.

Referring now to FIGS. 18 and 19, the radius limiter 50 includes a rotating element 114 located on a bottom surface 116 of the frame piece 154. The rotating element 114 causes the radius limiter 50 to rotate from a first position (not shown), occupied when the drawer 30 is closed, to a second rotated position (FIG. 3), occupied when the drawer 30 is open. In the first position, the radius limiter 50 is oriented such that no portion of the radius limiter extends beyond the outer edges 110 (FIG. 3) of the drawer 30. In this position, the radius limiter 50 can move within the chassis 16 without obstruction as the drawer 30 is being opened or closed.

Referring back to FIG. 5, the radius limiter is coupled to the drawer 30 of the drawer arrangement 14. In particular, the rotating element 114 is placed within the slot 148 of the side plate 142 of the drawer 30 and secured to the drawer slide 10 by a common type fastener 124. The fastener 124 is received within one of the threaded holes 66 in the central rail 44. As can be understood, the radius limiter 50 can be secured to either threaded hole 66 of the center rail, depending upon whether the drawer slide 10 is a left-handed slide or a right-handed slide.

The radius limiter 50 and the slot 148 are associated with each other to provide pivotal movement or rotation of the radius limiter 50 relative to the drawer 30. As shown in FIG. 20, the slot 148 of each of the side plates 142 includes an angled region 150. The rotating element 114 of the radius limiter 50 contacts the angled region 150 of the slot 148 causing the radius limiter 50 to pivot or rotate as the element 114 moves along the angled region 150.

Specifically, as the drawer 30 moves in the direction A from the closed position toward the open position, the rotating element 114 slides along a first region 132 in the first position. As previously described, the radius limiter 50 is in the first position when no portion of the radius limiter 50 extends beyond the edge 110 of the drawer 30. The first region 132 of the slot 148 has a first width W1.

As the drawer continues to slide outward in the direction A, the rotating element 114 contacts the angled region 150. The tapering width of the angled region 150 causes the rotating element 114' (and thus the radius limiter) to rotate, as shown in FIG. 20. As the drawer further continues to slide outward, the rotating element 114' contacts a second region 136 of the slot 148. The second region 136 has a second width W2. At this point the rotating element 114" and the radius limiter 50 fully rotate to the second rotated position (FIG. 3). The radius limiter 50 remains in this second rotated position as the drawer continues to open.

Referring back to FIG. 19, the rotating element 114 is configured with a first length L1 and a second length L2. The first length L1 corresponds to the first width W1 of the first region 132 of the slot 148; and the second length L2 corresponds to the second width W2 of the second region 136 of the slot.

The radius limiter 50 may be configured to pivot to various desired angles of rotation. By varying the design of the widths W1, W2 and lengths L1, L2 of the slot 148 and rotating element 114, and varying the angle of the angled region 150, the rotating limiter 50 can be configured to provide a range of rotational movement. In general, the range of rotational movement from the first position to the second rotated position is at least 10°, no greater than 120°, and typically about 80-100°. In the embodiment illustrated in FIG. 3, the radius limiter 50 is rotated 90° (represented by arrow C) relative to the first position.

In use, as the operator slides the drawer 30 relative to the chassis 16, the radius limiter 50 begins to rotate relative to drawer 30 to accommodate the orientation of the drawer 30 relative to the chassis 16 and thereby manage the bend radius of the cables. As can be understood, the point at which the radius limiter begins to rotate can be varied by locating the angled region further toward the front wall 34 of the drawer 30 or further toward the back wall 36 of the drawer. By this the radius limiter 50 can be designed to limit movement of the cables at selected times for better control and positioning of the cables.

Referring back to FIG. 16, the radius limiter 50 includes a tab 104 extending downward from the frame piece 154. The tab 104 cooperates with the chassis to automatically rotate the radius limiter 50 from the second rotated position to the first position when the drawer is being closed. In particular, the extension pieces 106 (FIG. 7) of the chassis 16 project forward from the sides 22. Referring to FIG. 1, as the drawer slides from the open position to a closed position, the tab 104 of the radius limiter contacts the extension piece 106, which pushes the radius limiter forward along the second region 136 of the slot 148. As the drawer continues to close, the radius limiter 50 is pushed along the angled region 150 and into the first region 132 of the slot 148. This causes radius limiter 50 to engage the angled region 150 of the slot 148 in a reverse direction (FIG. 20) and rotate from the second rotated position back to the first position (represented by arrow D in FIG. 3).

In the present drawer arrangement 14, the radius limiter is configured to automatically rotate from the first position to the second rotated position when the drawer is being opened; and automatically rotate from the second rotated position to the first position when the drawer is being closed. This means that the operator is not required to manually move the radius limiter when opening or closing the drawer. The design also does not rely upon gravity or cable weight to rotate the radius limiter. Rather, the radius limiter automatically rotates when the drawer is opened and automatically rotates back when the drawer closes. In addition, the present drawer arrangement 14 provides a radius limiter 50 that travel at half speed relative to the drawer position. In sum, the preferred radius limiter linearly and rotationally moves in a predetermined motion relative to the sliding position of the drawer 30.

IV. Mounting Structure

Referring back to FIG. 5, the drawer arrangement includes mounting structure 18 configured to mount the drawer arrangement 14 to a rack, cabinet, enclosure, or other mounting fixture (not shown). Generally the drawer arrangement 14 is secured to an existing system or a system having a predetermined spatial constraint on the width of the chassis.

In prior arrangements, mounting brackets were attached directly to the sides of a chassis. The thickness of the sides of the prior chassis was limited due to the outer spatial constraints of the chassis and the inner spatial constraints of prior ball-bearing slide arrangements. That is, the outer dimensions of the chassis are generally fixed, and the prior ball-bearing slide arrangements were larger than the presently disclosed drawer slide 10. This limited the structural thickness of the chassis sides. Because of the limited thickness of the sides, smaller screws, such as #4-40 UNC screws, were used to maximize thread engagement when securing the mounting bracket to the chassis sides. It was found, however, that the thread engagement was not sufficient if drawers having this type of mounting arrangement were dropped or handled roughly. The insufficient thread engagement cause particular concerns of structural instability in systems having a stacked number of drawers.

The drawer slide 10 of the present drawer arrangement 14 is smaller and more compact than the prior ball-bearing slide arrangements. The compact size of the drawer slide 10 makes feasible a mounting structure 18 having better structural stability.

Figure 21:
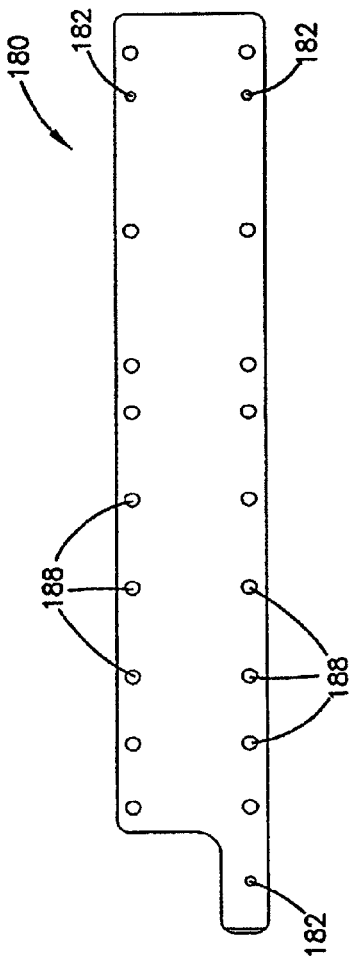
FIG. 21 is a backing plate of the drawer arrangement according to the principles disclosed, and shown in FIG. 5.
Figure 22:
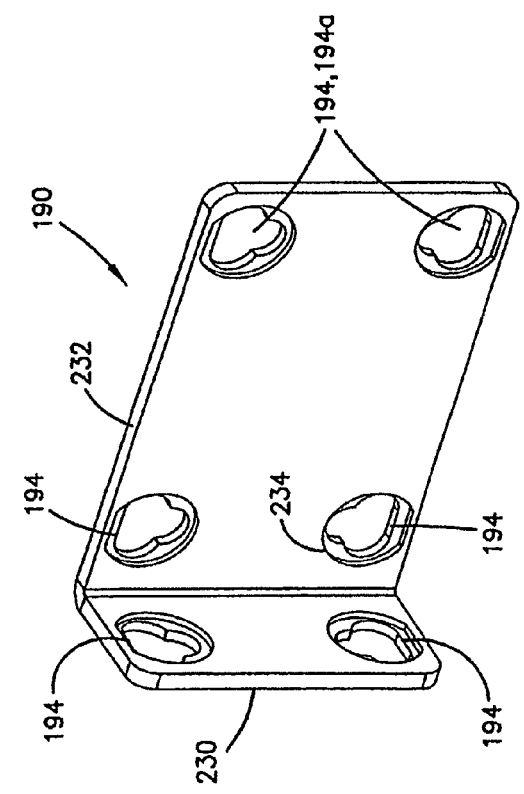
FIG. 22 is a mounting bracket of the drawer arrangement according to the principles disclosed, and shown in FIG. 5.
Figure 27:
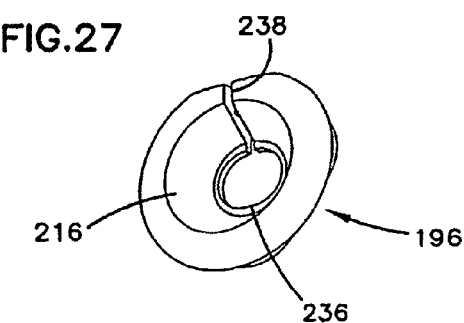
FIG. 27 is a top perspective view of a first preferred embodiment of a washer used with the mounting bracket of FIG. 22.
Figure 28:
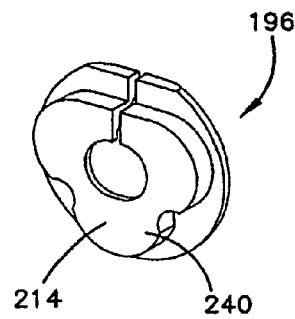
FIG. 28 is a bottom perspective view of the washer of FIG. 27.
Figure 29:
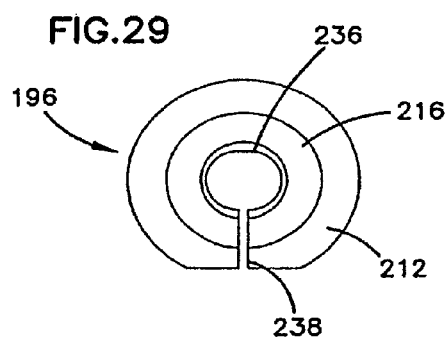
FIG. 29 is a top view of the washer of FIG. 27.
Figure 31:
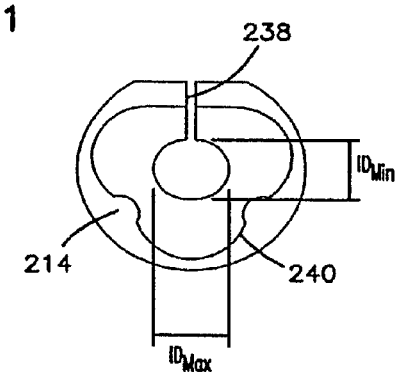
FIG. 31 is a bottom view of the washer of FIG. 27.
Figure 30:
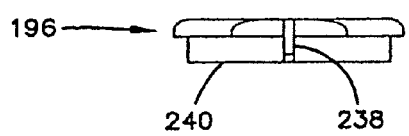
FIG. 30 is a side view of the washer of FIG. 27.

Referring to FIG. 5, the mounting structure 18 of the present disclosure includes backing plates 180 and mounting brackets 190. The backing plates 180 secure to the inside surfaces of the chassis sides 22. As shown in FIG. 21, each of the backing plates 180 has substantially the same shape as the side 22 of the chassis 16. Threaded holes 182 formed in the backing plate 180 correspond to holes 184 (FIG. 5) in the side 22. Fasteners 186 are used to secure the backing plate 180 to the side 22. In the alternative, the backing plate 180 can be secured to the side 22 by other conventional means, such as rivets or spot weldments.

The backing plate 180 includes threaded holes 188. The threaded holes 188 correspond to through holes 192 formed in the chassis side 22. The threaded holes 188 and through holes 192 can be arranged in a variety of hole patterns suited to provide flexibility in placement of the mounting bracket 190.

Referring now to FIGS. 5 and 22-26, the mounting bracket 190 is generally an L-shaped bracket. The mounting bracket 190 includes apertures 194 shaped for receipt of tri-lobe washers 196. The tri-lobe washers 196 are used with fasteners 198 to secure the mounting bracket 190 to the side 22 of the chassis. In the illustrated arrangement, the fasteners 198 extend through holes 192 in the side 22 of the chassis and engage the threaded holes 188 of the backing plate 180. The thickness of the backing plate 180 permits use of larger threaded fasteners, and a lesser quantity of fasteners, in comparison to the size and number fasteners used in the prior mounting arrangements. That is, the backing plate 180 provides added structural thickness, which facilitates use of the larger fasteners. In the illustrated embodiment, #8-32 UNC threads are used. Mounting the drawer arrangement 14 is made easier with a lesser number of larger threaded fasteners; the larger threads of the fasteners also providing greater structural stability.

Each mounting bracket 190 defines an L-shape with first and second plate members 230, 232 positioned transversely to one another, preferably at 90°. Each plate member 230, 232 includes at least two apertures 194. Apertures 194 are in the shape of a tri-lobe wherein a rack fastener can be positioned in a variety of locations within aperture 194 for use in mounting bracket 190 to a plurality of racks or other mounting fixtures having different hole spacing formats. For example, a tri-lobe opening 194 in first plate member 230 is useful for reducing the number of individual holes needed in bracket 190 when an operator desires to use bracket 190 with different rack formats such as WECO or EIA rack hole spacings.

Preferred bracket 190 is reversible so that second plate member 232 can be used to mount to the rack, such as in the situation when a wider rack is used. For example, bracket 190 is used as shown in FIG. 1 for a 19 inch rack. Bracket 190 can be turned so that first plate member 230 is mounted adjacent to side 22 of drawer arrangement 14. Second plate member 232 extends transversely from drawer 30, and the outer two apertures 194a would be used to receive fasteners to mount drawer arrangement 14 to a 23 inch rack. Depending on the hole positions and spacings on each rack, a rack fastener can reside in different portions of apertures 194, 194a without the need for separate holes for each individual rack format. Also, brackets 190 can be mounted adjacent to a rear of drawer arrangement 14, such as to wall mount the chassis. All four apertures 194 in second plate member can be used to mount bracket 190 to the chassis. Preferably all apertures 194 are tri-lobed for ease of manufacture and use with different racks.

Apertures 194 also include a counterbore 234. Apertures 194 and counterbore 234 receive one of the tri-lobe washers 196 to reduce the profile of the chassis for maximizing drawer space in the rack. Referring now to FIGS. 27-31, one embodiment of a tri-lobe washer 196 is shown. Washer 196 includes a central opening 236 extending between a top 212 and a bottom 214. Top 212 further includes a countersink 216. Countersink 216 allows for receipt of a flat head screw. Washer 196 further includes a slot 238 which allows for flexing of washer 196 so as to be releaseably retained on fasteners 198. Opening 236 is provided with two different major dimensions, to define the general shape of an oval. The minimum diameter of opening 236 is generally equal to the pitch diameter of fastener 198. The maximum diameter of opening 236 is generally equal to or greater than the thread outer diameter. In this manner, washer 196 is retained with one of the fasteners 198.

Bottom surface 214 of washer 196 includes a protrusion 240 for receipt in tri-lobe aperture 194. Washer 196 does not substantially increase the protrusion of the head of fastener 198, especially when flat head screws and the counterbore 234 are used. In this manner, the spacing between the sides of the chassis can be maximized for use in cable storage and management.

Figure 32:
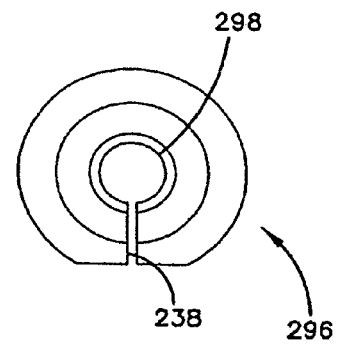
FIG. 32 is a top view of a second preferred embodiment of a washer.

Referring now to FIG. 32, an alternative washer 296 is shown. Washer 296 includes a threaded aperture 298. In a similar manner as washer 196, washer 296 is retained on fastener 198. Slot 238 allows for the threads to skip as fastener 198 is tightened into the sides of the chassis. Alternatively, washers 196, 296 do not need to be slotted. Preferably, some retention mechanism is desired for ease of use. However, such retention mechanism is not required.

V. Alternative Embodiment

Figure 33:
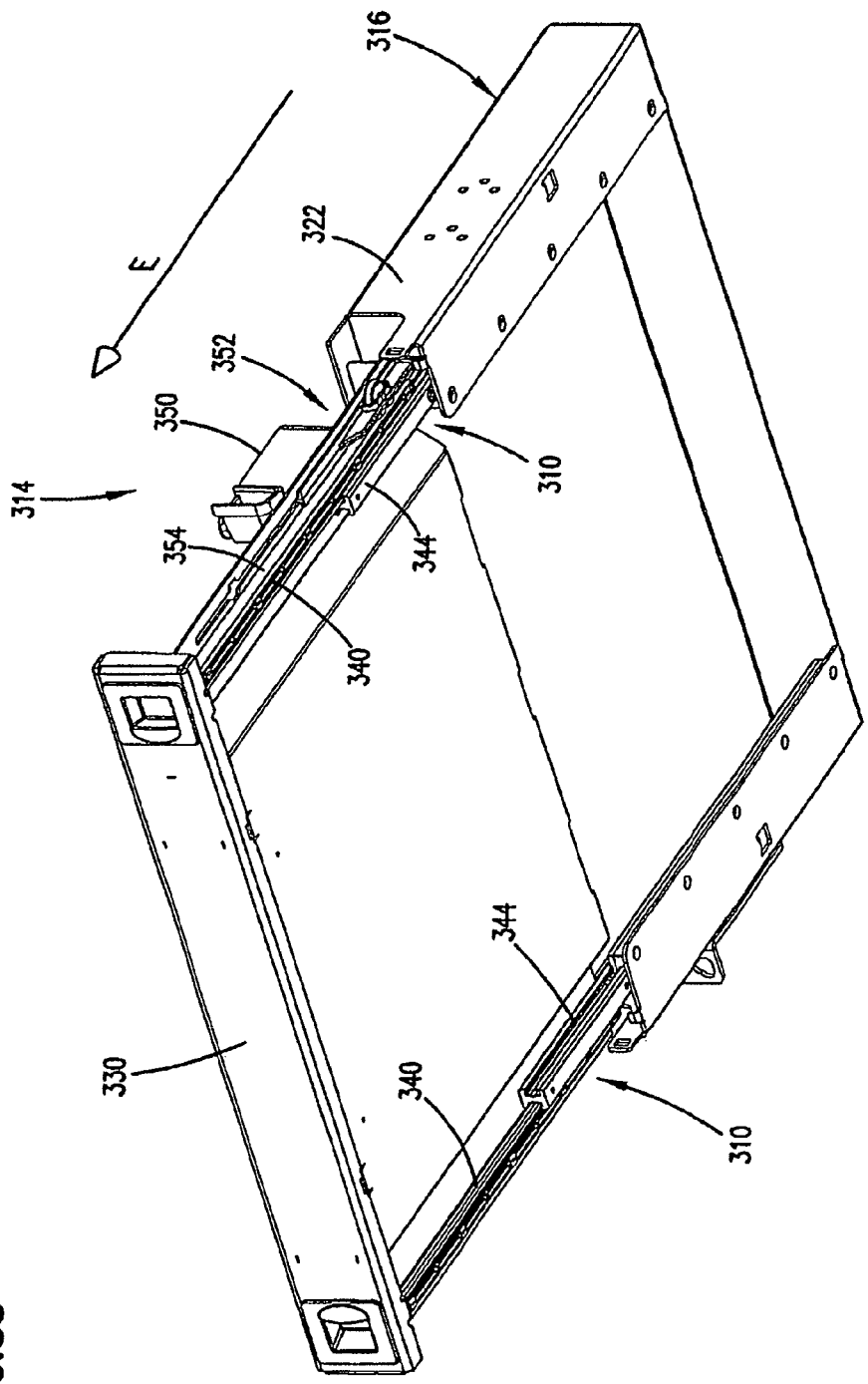
FIG. 33 is a bottom perspective view of another embodiment of a drawer arrangement according to the principles of the present disclosure.
Figure 34:
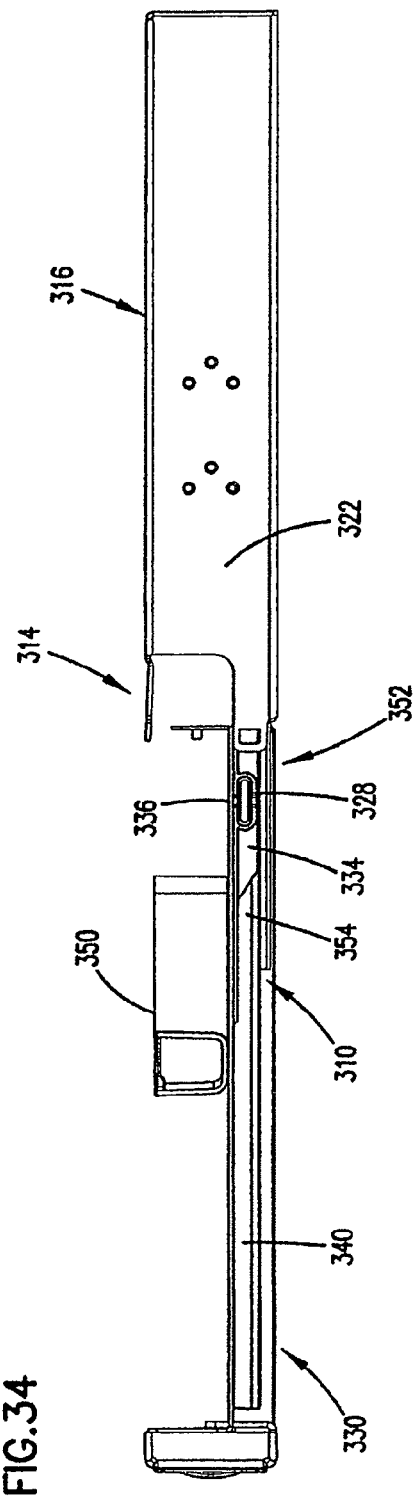
FIG. 34 is a side elevational view of the drawer arrangement of FIG. 33.
Figure 35:
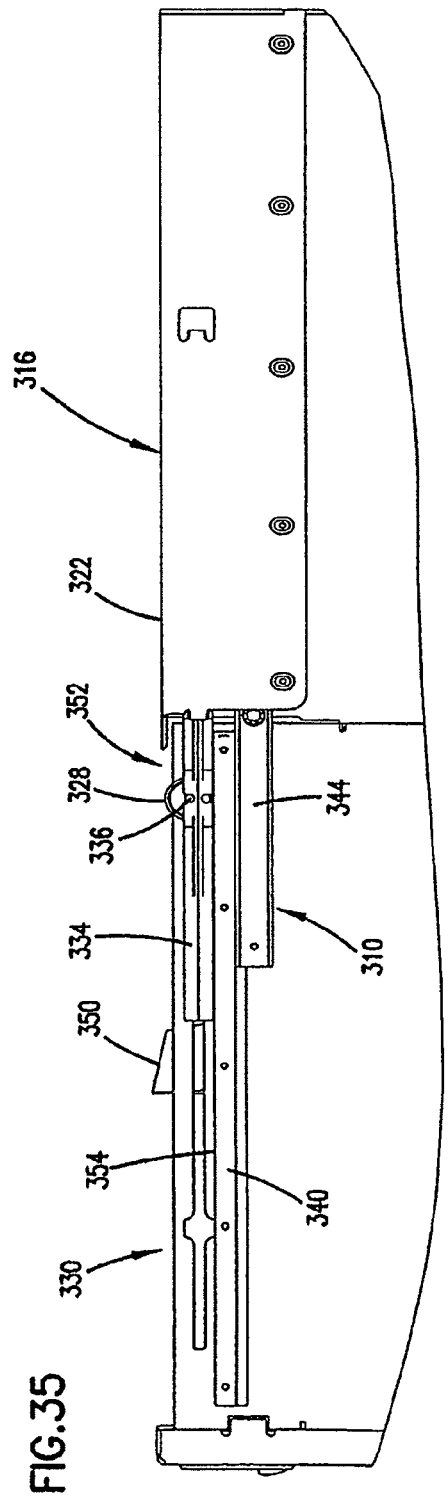
FIG. 35 is a partial bottom plan view of the drawer arrangement of FIG. 34.

Referring now to FIGS. 33-35, an alternative embodiment of a drawer arrangement 314 is shown. The drawer arrangement 314 has similar components as the previously disclosed embodiment, with the exception of a control and take-up mechanism.

The drawer arrangement 314 generally includes a frame or chassis 316 and a drawer 330. A drawer slide 310 operably interconnects the drawer 330 and the chassis 316 to provide slideable movement of the drawer 330 relative to the chassis 316 in the direction represented by arrow E in FIG. 33. The drawer slide 310, having a first rail 340, a second rail 342, and a center rail 344, is identical in construction and operation to the previous drawer slide embodiment. The drawer slide 310 is also similarly located within the drawer arrangement 314; that is, the first rail 340 secures to the drawer 330, the second rail 342 secures to the chassis 316, and the center rail 344 interconnects the first and second rails 340, 342.

The alternative drawer arrangement 314 also includes a radius limiter 350 for managing cables during sliding movement of the drawer 330. The radius limiter 350 is operated by a control-mechanism 352. The control-mechanism 152 is disclosed in U.S. application Ser. No. 09/900,465, previously incorporated herein by reference. In general, the control mechanism 352 includes a wheel 328 oriented to rotate between the drawer 330 and the chassis 316.

The control mechanism 352 includes a bracket 334 having an axle 336. The wheel 328 is mounted for rotation on the axle 336 of the bracket 334. In operable assembly, the wheel 328 rotates about its axle 336 between and against an outer side surface 354 of the first rail 340 and an inside surface (not shown) of a side 322 of the chassis 316. Positioning the wheel 328 to rotate between the first rail 340 of the drawer slide 310 and the side 322 of the chassis 316 allows the radius limiter 350 to move at one-half of the speed of the movement of the drawer 330 relative to the chassis 316.

In this present embodiment, the radius limiter 350 rotates from a first position (FIGS. 33-35) to a second rotated position (not shown) by either manual rotation from an operator or forces of resistance caused by the cables.

The drawer slide 10, 310 of the present disclosure can be a machined metal or alloy, or an extruded plastic. Although the illustrated embodiment of the drawer slides 10, 310 each include a center rail having longitudinal constructions (grooves 46, 48) and first and second rails having protrusion 56, 58, the interlocking components of the rails 40, 42, and 44 can be reversed. That is, in accord with the principles disclosed, the center rail may be configured with protrusions that interlock with grooves on each of the first and second rails.

The disclosed drawer slide offers several advantages over prior ball-bearing slide arrangements. In particular, the drawer slide eliminates the need for lubricants required in ball-bearing designs. Lubricants can contaminate electronics housed within the drawer assembly. The drawer slide of the present disclosure is compact is and light weight. By its compactness, and self-contained design, the drawer slide is not restricted to location, permitting use in a variety of drawer arrangement configurations. The light weight feature of the drawer slide also reduces costs associated with shipping and handling.

The above specification provides a complete description of the SLIDE ARRANGEMENT FOR CABLE DRAWER. Since many embodiments of the invention can be made without departing from the spirit and scope of the invention, certain aspects of the invention resides in the claims hereinafter appended.

What is claimed is:

1. A slide arrangement, comprising:
   a) first and second rails including first and second structures, respectively;
   b) an I-shaped center rail including:
      i) a center portion having a longitudinal dimension that extends between opposite ends of the center portion;
      ii) transverse portions located at the ends of the center portion, the transverse portions being oriented transverse to the longitudinal dimension of the center portion to define the I-shape of the center rail;
      iii) the I-shape of the center rail defining first and second longitudinal constructions extending from a first end to a second end of the center rail, each of the first and second longitudinal constructions being sized to receive only one of the first and second structures of the first and second rails, respectively, each of the first and second structures of the first and second rails, respectively, being configured to slidably engage the first and second constructions of the center rail;
      iv) the first longitudinal construction of the center rail including a first longitudinal groove extending from the first end of the center rail to the second end, and the second longitudinal construction including a second longitudinal groove extending from the first end of the center rail to the second end; and
   c) a spool configured to contact at least one of the first and second rails when the first rail slides relative to the second rail, the spool having an axis of rotation parallel to a longitudinal dimension of the center portion of the I-shaped center rail.

2. The slide arrangement of claim 1, wherein the first structure of the first rail includes a first interlocking structure, and the second structure of the second rail includes a second interlocking structure, each of the first and second interlocking structures being configured to slidably engage the respective first and second grooves of the center rail.

3. The slide arrangement of claim 1, wherein the spool is positioned at the center rail.

4. The slide arrangement of claim 3, wherein the spool is positioned within a receiving structure formed in the center rail.

5. The slide arrangement of claim 4, wherein the spool has a snap-fit construction configured for receipt within the receiving structure of the center rail.

6. The slide arrangement of claim 5, wherein the spool includes a flexible outer ring configured to snap fit within the receiving structure of the center rail.

7. The slide arrangement of claim 6, wherein the flexible outer ring includes a plurality of ring sections circumferentially spaced apart from one another, the ring sections being configured to flex when the spool is snap fit into the receiving structure.

8. The slide arrangement of claim 4, wherein the receiving structure includes apertures formed in the center rail.

9. The slide arrangement of claim 8, wherein the apertures are formed within the first and second longitudinal constructions of the center rail.

10. The slide arrangement of claim 9, wherein the spool includes an o-ring circumferentially positioned about a spool axle.

11. The slide arrangement of claim 9, wherein the o-ring extends through the first and second apertures of the receiving structure to contact the first and second rails.

12. The slide arrangement of claim 11, wherein the o-ring extends through the apertures to contact the first and second interlocking structure of the first and second rails, respectively.

13. The slide arrangement of claim 1, wherein the spool is configured to permit the center rail to travel at half-speed relative to the travel speed of the first rail when the second rail is held stationary.

14. The slide arrangement of claim 1, further including a catch arrangement configured to pause sliding movement of the first rail when the first and center rails have reached a first extended position.

15. The slide arrangement of claim 14, wherein the catch arrangement includes a projection located at an end of each of the first and second rails, the projection being sized to cause an interference with the spool when the first and center rails reach the first extended position.

16. The slide arrangement of claim 1, further including a positive stop arrangement configured to prevent linear separation of the first and second rails from the center rail.

17. The slide arrangement of claim 16, wherein the positive stop arrangement includes a shoulder formed on each of the first and second rails, and stop ledges formed on the center rail, the shoulders being configured to contact the stop ledges of the center rail to prevent further longitudinal travel beyond a second extended position.

18. The slide arrangement of claim 17, wherein the shoulders are formed on first and second interlocking structures defined by the respective first and second structures of the first and second rails, and the stop ledges are formed within first and second longitudinal grooves defined by the respective first and second longitudinal constructions of the center rail.

19. The slide arrangement of claim 16, further including a catch arrangement configured to indicate when the rails have slid to an extended position relative to one another, wherein engagement of the catch arrangement occurs prior to engagement of the positive stop arrangement.

* * * * *